US012706894B2

(12) United States Patent
Seidemann et al.

(10) Patent No.: US 12,706,894 B2
(45) Date of Patent: Aug. 11, 2026

(54) KEY DISTRIBUTION FOR A PHYSICAL UNCLONABLE ENCRYPTION SYSTEM

(71) Applicant: BASF SE, Ludwigshafen am Rhein (DE)

(72) Inventors: Lothar Seidemann, Ludwigshafen am Rhein (DE); Holger Kai Peter Jelich, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 449 days.

(21) Appl. No.: 18/039,730

(22) PCT Filed: Dec. 1, 2021

(86) PCT No.: PCT/EP2021/083730
§ 371 (c)(1),
(2) Date: Jun. 1, 2023

(87) PCT Pub. No.: WO2022/117626
PCT Pub. Date: Jun. 9, 2022

(65) Prior Publication Data

US 2024/0007451 A1 Jan. 4, 2024

(30) Foreign Application Priority Data

Dec. 2, 2020 (EP) .................................... 20211297

(51) Int. Cl.
*H04L 9/08* (2006.01)
*G06F 3/12* (2006.01)
*H04L 9/40* (2022.01)

(52) U.S. Cl.
CPC .......... *H04L 63/061* (2013.01); *G06F 3/1222* (2013.01); *G06F 3/1238* (2013.01);
(Continued)

(58) Field of Classification Search
CPC . H04L 63/061; H04L 9/0869; H04L 63/0435; G06F 3/1222; G06F 3/1238; G06F 3/1257; G06F 3/1267; G06F 3/1285
See application file for complete search history.

(56) References Cited

U.S. PATENT DOCUMENTS

2004/0153649 A1* 8/2004 Rhoads ................ G07D 7/0034
707/E17.112
2014/0307869 A1 10/2014 Krummel et al.
(Continued)

FOREIGN PATENT DOCUMENTS

EP 3086543 A1 10/2016
JP 2016-208359 A 12/2016
(Continued)

OTHER PUBLICATIONS

Gassend et al., "Silicon physical random functions." Proceedings of the 9th ACM conference on Computer and communications security, Nov. 2002, pp. 148-160.
(Continued)

*Primary Examiner* — Jeffrey Nickerson
*Assistant Examiner* — Amit Khadka
(74) *Attorney, Agent, or Firm* — Faegre Drinker Biddle & Reath LLP

(57) ABSTRACT

Disclosed here is a system and method to distribute symmetric encryption keys between respective nodes of a communication system. A node comprises a printing device that generates session key information or an encryption key based on changing printer control setting information and printer job information of the printing device. Operations comprise providing an initial session key information, which is used to encrypt an initial session package that includes first session key information for respective nodes. A node further generates, based on a second printer control setting and a second printer job setting, second session key infor-
(Continued)

mation and sends a message that is encrypted with the first session key information. The message includes the second session key information. Respective session key information represents a unique identifier based on printer control setting information and printer job information of a printing device in a node as a physical unclonable function.

13 Claims, 6 Drawing Sheets

(52) U.S. Cl.
CPC .......... *G06F 3/1257* (2013.01); *G06F 3/1267* (2013.01); *G06F 3/1285* (2013.01); *H04L 9/0869* (2013.01); *H04L 63/0435* (2013.01)

(56) References Cited

U.S. PATENT DOCUMENTS

2017/0372084 A1* 12/2017 Murashita ................. H04L 9/16
2018/0240086 A1 8/2018 Sobotka
2018/0247061 A1* 8/2018 Mochizuki ............ G06F 3/1238
2019/0020631 A1 1/2019 Leavy et al.
2019/0229902 A1 7/2019 Zheng et al.
2020/0220719 A1* 7/2020 Chaudhari ............ H04L 9/0822

FOREIGN PATENT DOCUMENTS

JP 2018-001468 A 1/2018
WO 2021/001147 A1 1/2021

OTHER PUBLICATIONS

Handlungsempfehlungen des BSI, "Migration zu Post-Quanten-Kryptografie,", Bundesamt für Sicherheit in der Informationstechnik, Aug. 2020, pp. 9.
Pappu et al., "Physical One-Way Functions," Science, vol. 297, No. 5589, Sep. 20, 2002, pp. 2026-2030.
International Search Report and Written Opinion received for PCT Patent Application No. PCT/EP2021/083730, mailed on Mar. 14, 2022, 12 pages.

* cited by examiner 110
112
128
130
N1
N2
N3
Nm
KS1,0
KS2,0
KS3,0
KSm,0

KEY DISTRIBUTION FOR A PHYSICAL UNCLONABLE ENCRYPTION SYSTEM

CROSS-REFERENCE TO RELATED APPLICATIONS

This application is a National stage application (under 35 U.S.C. § 371) of PCT/EP2021/083730, filed Dec. 1, 2021, which claims benefit of European Application No. 20211297.5, filed Dec. 2, 2020, both of which are incorporated herein by reference in their entirety.

TECHNICAL FIELD

The invention relates to a computer-implemented method for distributing symmetric encryption keys in a communication system comprising a plurality of nodes, a communication system, a computer program and uses of the communication system. The methods, devices and systems according to the present invention specifically may be used for secure communication over at least one insecure channel, such as for data transmission over an insecure channel like e.g. the Internet or radio communication. Further, at least some of the methods and devices of the present invention may also be used in the field of data encryption for secure data storage purposes or the like. Thus, encrypted data may also be stored, such as in one or more data storage devices accessible over the at least one insecure channel, such as over the Internet. Other applications are possible.

BACKGROUND ART

In many applications, information or data representing information has to be transmitted or stored in an insecure environment, such as publicly accessible communication networks, the cloud or the like. In order to ensure that the data is accessible only to authorized persons or entities, various cryptographic methods have been developed. Therein, data, such as data representing a message or other information is generally encoded in such a way that only authorized parties can access the data, whereas parties not authorized cannot or, at least, can only do so with significant difficulty or technical effort. Typically, data is encrypted by using at least one encryption algorithm using at least one encryption key, wherein the data, also referred to as plaintext, is generally transformed into encrypted data, also referred to as ciphertext. For decrypting the encrypted data or ciphertext and for retrieving the original data or plaintext, decrypting algorithms are used, which typically apply one or more encryption keys, too. Therein, the at least one encryption key used for decrypting may be identical to the at least one encryption key used for encrypting or, alternatively, different encryption keys may be used for encrypting and decrypting. While it is, in principle, possible to decrypt the message without possessing the encryption key, generally, for most of the nowadays used encryption algorithms, considerable computational resources, skills and computational time are required. An authorized recipient, however, can typically easily decrypt the encoded data, specifically the encoded message, with the use of the encryption key, such as the encryption key provided by the originator to recipients but not to unauthorized users.

An overview of typical cryptographic methods can be found in "Migration zu Post-Quanten-Kryptografie, Handlungsempfehlungen des BSI", Bundesamt für Sicherheit in der Informationstechnik, August 2020.

One technical challenge in typical cryptographic methods generally resides in generating the at least one encryption key for the encryption process and/or for the decryption process. In practical applications, significant computational effort may have to be applied in order to generate, by using appropriate key generating algorithms, keys providing satisfactory data security for the data to be stored and/or or transmitted. Further, specifically in symmetric encryption algorithms, the transmittal of the encryption key, specifically over insecure data transmission channels, is still a challenge. Thus, the encryption key may be accessed by unauthorized parties or may even be intercepted and changed by unauthorized parties. There is, consequently, a need for simple and still secure means of generating encryption keys, of encrypting and decrypting data and for simple and secure encrypted data transmission.

The technical challenge is further increased by progress in computer technology and by the possibility of applying a so-called "brute-force approach" for decrypting encrypted data. Thus, with increasing availability of computer power and resources, trial-and-error approaches for decrypting data become possible. The challenge is even increased by the fact that, within the near future, quantum computing might be available for decrypting arbitrary algorithmic approaches of data encryption.

While establishing an encryption system, the secure distribution of the system key and the secure generating of the session keys is crucial to avoid that any hacker can take these keys to be able to decrypt the ciphertext. Especially, in encryption systems, such as the advanced encryption standard (AES) technology, data volume of the system key to be distributed to generate the session keys locally is significant. This means that the efforts to share this information in an encrypted way, which is secure, are significant.

To achieve the high level of security, it has been shown that cryptographic technologies that exploit the physical properties of disordered systems can be applied. According to Pappu, R.; Recht, B.; Taylor, J.; Gershenfeld, N. (2002). "*Physical one-way functions*". *Science.* 297 (5589): 2026-2030. Bibcode: 2002Sci . . . 297.2026P and Blaise Gassend, Dwaine Clarke, Marten van Dijk and Srinivas Devadas. *Silicon Physical Random Functions. Proceedings of the Computer and Communications Security Conference*, November 2002, these cryptographic technologies are called physical unclonable functions, or PUF, which are in general physical objects that provide for a given input and conditions, a physically-defined digital output that serves as a unique identifier. In many cases, PUFs are most often based on unique physical variations which occur naturally during semiconductor manufacturing. PUFs are usually implemented in integrated circuits and are typically used in applications with high security requirements, more specifically cryptography. As PUFs depend on the uniqueness of their physical microstructure, PUFs are unpredictable and uncontrollable, which makes it virtually impossible to duplicate or clone the structure.

PROBLEM TO BE SOLVED

It is therefore desirable to provide methods and devices which address the above-mentioned technical challenges. Specifically, a computer-implemented method for distributing symmetric encryption keys in a communication system and a communication system shall be provided, which ensure secure distribution of keys.

SUMMARY

This problem is addressed by a computer-implemented method for distributing symmetric encryption keys in a communication system, a communication system, a computer program and uses of the communication system, with the features of the independent claims. Advantageous embodiments which might be realized in an isolated fashion or in any arbitrary combinations are listed in the dependent claims.

As used in the following, the terms “have”, “comprise” or “include” or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions “A has B”, “A comprises B” and “A includes B” may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms “at least one”, “one or more” or similar expressions indicating that a feature or element may be present once or more than once typically will be used only once when introducing the respective feature or element. In the following, in most cases, when referring to the respective feature or element, the expressions “at least one” or “one or more” will not be repeated, non-withstanding the fact that the respective feature or element may be present once or more than once.

Further, as used in the following, the terms “preferably”, “more preferably”, “particularly”, “more particularly”, “specifically”, “more specifically” or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by “in an embodiment of the invention” or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the present invention, a computer-implemented method for distributing symmetric encryption keys in a communication system comprising a plurality of nodes is proposed.

The term “computer implemented method” as used herein is a broad term and is to be given its ordinary and customary meaning to a person of ordinary skill in the art and is not to be limited to a special or customized meaning. The term specifically may refer, without limitation, to a method involving at least one computer and/or at least one computer network. The computer and/or computer network may comprise at least one processor which is configured for performing at least one of the method steps of the method according to the present invention. Preferably each of the method steps is performed by the computer and/or computer network. The method may be performed completely automatically, specifically without user interaction. The term “automatically” as used herein is a broad term and is to be given its ordinary and customary meaning to a person of ordinary skill in the art and is not to be limited to a special or customized meaning. The term specifically may refer, without limitation, to a process which is performed completely by means of at least one computer and/or computer network and/or machine, in particular without manual action and/or interaction with a user.

The term “encrypt” as used herein is a broad term and is to be given its ordinary and customary meaning to a person of ordinary skill in the art and is not to be limited to a special or customized meaning. The term specifically may refer, without limitation, to the process of modifying one or more of a message, information or data, by using at least one encryption means, also referred to as an encryption key, such that only authorized parties can access it and those who are not authorized cannot. The modified data, as generated by the encryption process, may also be referred to as “encrypted data”. Specifically, the encryption may comprise a process of modifying one or more of a message, information or data in such a way that only a person being in possession of specific authorization means, also referred to as an encryption key, may transform the modified message, information or data into its original or readable form and, thereby, may retrieve the original message, information or data. The encrypting or encryption process, i.e. the process of modifying the message, information or data specifically may involve an encryption algorithm, by combining the message, information or data with at least one encryption key. As an example, in a binary format, each bit of the message, information or data may be combined with a corresponding bit of the encryption key, thereby generating an encrypted bit. Other encryption algorithms are generally known and may also be used in the context of the present invention.

Consequently, the term “decrypt” as used herein is a broad term and is to be given its ordinary and customary meaning to a person of ordinary skill in the art and is not to be limited to a special or customized meaning. The term specifically may refer, without limitation, to the reverse process of the above-described process of encryption. The term specifically may refer, without limitation, to the process of re-modifying encrypted data, by using at least one decryption means, also referred to as an encryption key, such that the encrypted data is transformed into the readable format, i.e. into one or more of the original message, information or data in a readable format. The process of modifying the encrypted data specifically may involve a decryption algorithm, e.g. combining the encrypted data with the at least one encryption key. As an example, in a binary format, each bit of the encrypted data may be combined with a corresponding bit of the encryption key, thereby generating a decrypted bit. Other decryption algorithms are generally known and may also be used in the context of the present invention.

Consequently, the term “encryption key” as used herein is a broad term and is to be given its ordinary and customary meaning to a person of ordinary skill in the art and is not to be limited to a special or customized meaning. The term specifically may refer, without limitation, to an encryption means or decryption means used in an encryption process or in a decryption process, respectively. The term specifically may refer to an item of information that determines the functional output of a cryptographic algorithm such as an encryption process and/or the decryption process. Encryption keys may also specify transformations in other cryptographic algorithms, such as digital signature schemes and message authentication codes.

For the process of encryption and for the process of decryption, identical keys may be used. Thus, both for the key used in the encryption process and for the key used in the decryption process, the term “encryption key” is typically used. The present invention may refer to the symmetrical encryption processes.

In the method according to the present invention, in particular in steps a) to d) of the method which will be described in detail below, solely symmetric encryption may be used. The method according to the present invention may allow for transmission error free distribution of encryption key using symmetric methods. Specifically, the method according to the present invention may allow for transmission error free distribution of encryption key without using asymmetric methods (such as RSA). Thus, the present invention proposes an approach which, due to very small initial session key information, which will be described in more detail below, does not require asymmetric methods (such as RSA). The proposed method is more secure compared to known symmetric approaches (e.g. AES), which require exchange of significant larger data packages for initiation via asymmetric methods (like RSA) (where "typing" the key information into an input mask is impractical because it is prone to errors).

The term "distributing" encryption keys as used herein is a broad term and is to be given its ordinary and customary meaning to a person of ordinary skill in the art and is not to be limited to a special or customized meaning. The term specifically may refer, without limitation, to process of providing encryption keys from at least one sending entity or transmitter to at least one receiving entity or receiver via at least one communication means, such as at least one communication channel and/or at least one communication interface.

The term "communication system" as used herein is a broad term and is to be given its ordinary and customary meaning to a person of ordinary skill in the art and is not to be limited to a special or customized meaning. The term specifically may refer, without limitation, to a device or a combination of devices configured for transmitting data and/or configured for receiving data. Specifically, the communication system may be a network comprising a plurality of nodes, such as at least two, preferably three, four or more, nodes, configured for exchanging data between the nodes via at least one communication channel. The term "data" as used herein is a broad term and is to be given its ordinary and customary meaning to a person of ordinary skill in the art and is not to be limited to a special or customized meaning. The term specifically may refer, without limitation, to information and/or to machine-readable signals or symbols representative for information. The data specifically may be or may comprise one or both of digital data and analogue data. The data, as an example, may be stored and/or provided via at least one data storage device. The data generally may be provided in various formats. Specifically, the data may be provided in digital format and/or the data may comprise digital data. The data specifically may comprise binary data. However, other data formats are also possible. The data specifically may be subdivided into data packages. Thus, as an example, the data may comprise a plurality of data packages, each data package comprising at least one of a data header, control data and a payload portion. The data, generally, may also comprise error correction data. Thus, as an example, the error correction data may comprise at least one parity bit or the like. Other data correction algorithms may be used.

The term "node" as used herein is a broad term and is to be given its ordinary and customary meaning to a person of ordinary skill in the art and is not to be limited to a special or customized meaning. The term specifically may refer, without limitation, to at least one physical device and/or participant of the communication system configured for generating, receiving, and/or transmitting information over the at least one communication channel. The node may either be a redistribution point or a communication endpoint. Preferably, all or at least two, three or more of the nodes are set up for communicating with one another in a wireless or wire-based fashion. The communication may be configured in each case in a unidirectional or else bidirectional fashion.

Specifically, each of the nodes may comprise at least one data transmission system for transmitting encrypted data and at least one data receiving system for receiving encrypted data. The term "data transmission system" as used herein is a broad term and is to be given its ordinary and customary meaning to a person of ordinary skill in the art and is not to be limited to a special or customized meaning. The term specifically may refer, without limitation, to an arbitrary device or combination of devices configured for transmitting data, such as to a radio transmitter, a network transmitter, a modem, an IR-transmitter, a Bluetooth transmitter or the like. Analogously, the term "data receiving system" as used herein is a broad term and is to be given its ordinary and customary meaning to a person of ordinary skill in the art and is not to be limited to a special or customized meaning. The term specifically may refer, without limitation, to an arbitrary device or combination of devices configured for receiving data, such as a radio receiver, a network receiver, a modem, an IR receiver, a Bluetooth receiver or the like.

Each of the nodes comprises a printing device configured for generating at least one encryption key for encrypting data based on changing printer control setting and printer job. The encryption key may be generated based on key generating information, wherein the key generating information may comprise two components, a printer control settings and a printer job. Each node comprises information about possible printer control settings and possible printer jobs. The encryption key specifically may be used for data transmission over an insecure channel, such as for encrypting data to be transmitted over the insecure channel and/or for decrypting data after transmission over the insecure channel. The printer job may also be denoted as printer job setting.

The term "insecure" as used herein is a broad term and is to be given its ordinary and customary meaning to a person of ordinary skill in the art and is not to be limited to a special or customized meaning. The term specifically may refer, without limitation, to the property of a channel for transmission being accessible not only for the transmitting entity and the receiving entity but also to third parties. Thus, specifically, an insecure channel, as outlined above, may be or may comprise the internet.

The term "printing device", also denoted as printer, as used herein is a broad term and is to be given its ordinary and customary meaning to a person of ordinary skill in the art and is not to be limited to a special or customized meaning. The term specifically may refer, without limitation, to a device configured for applying, e.g. printing, at least one material onto at least one printing surface or substrate, specifically in a patterned fashion, according to the printer control setting.

The term "printer control setting" as used herein is a broad term and is to be given its ordinary and customary meaning to a person of ordinary skill in the art and is not to be limited to a special or customized meaning. The term specifically may refer, without limitation, to printer control information comprising a plurality of parameters for controlling at least one function of the printing device. The printer control setting may comprise at least one item of blending information, which will be outlined in more detail below. Thus, typically, the printing device may be configured for generating text and/or images on the at least one printing surface according to the printer control setting, such as one or more of a string of characters, a bitmapped image, a vector image, a computer program, e.g. provided in at least one printer control language. In particular, the printing device, specifically at least one function of the printing device, may be controllable via at least one printer control language, such as one or more page description languages (PDLs), printer command languages (PCLs), PostScript, XML Paper Specification and the like.

The term "printer job" as used herein is a broad term and is to be given its ordinary and customary meaning to a person of ordinary skill in the art and is not to be limited to a special or customized meaning. The term specifically may refer, without limitation, to at least one digital image of at least one physical object. Each printer job may comprise at least one digital image of at least one physical object.

The possible printer control settings may comprise more than $10^6$ printer control settings. The possible printer jobs may comprise about $10^6$ printer jobs. An individual number, in particular an integer number, may be assigned to each of the possible printer control settings and possible printer jobs. The possible printer control settings and the possible printer jobs may be stored in a database of the printing device. The possible printer control settings and the possible printer jobs may be pre-stored by a manufacturer of the printing device and/or may be provided in addition to the printing device by the manufacturer to the customer.

Because the node possess all possible printer control settings and possible printer jobs, for generating the encryption key only the key generating information comprising a number referring to the printer control setting and a number referring to the printer job may be required. Said two numbers may be sufficient to control the printing device and for printing the digital image for generating the encryption key.

In particular, the printing device may comprise one or more of a drum, such as an image drum; a laser, a lens system, such as a lens system comprising at least one mirror, e.g. a rotatable mirror; a cleaning element, such as a roll, a scraper or similar means for cleaning, e.g. for cleaning the drum; a cassette, e.g. for storing one or more of the substrate, such as a paper cassette; at least one transporting element, such as a roller and/or conveyor, e.g. for feeding, transferring and/or ejecting the substrate, specifically the paper, into, within and/or from the printing device; a printer control unit configured for controlling the printing device.

The generating of the encryption key may comprise

- selecting a printer control setting and a printer job and performing the printer job with the selected printer control setting, wherein the performing of the printer job comprises printing the digital image by mixing pigments;
- scanning the mixed pigments and detecting at least one optical signal by using at least one detector of the printing device;
- transforming the optical signal into the encryption key by using at least one data processing device of the printing device configured for applying at least one transformation algorithm to the optical signal.

The term "selecting a printer control setting and a printer job" may comprise choosing a specific printer control setting and specific printer job out of the possible printer control settings and the possible printer jobs. The selecting of the printer control setting and the printer job may be performed by a processor and/or by manual selection.

The printing of the digital image may be performed as follows. The printing device may be configured for use as a blending device in an encryption key generating device. Specifically, the printing device is configured for receiving the at least one item of blending information and for generating the at least one encryption key for encrypting data. The printing device may specifically be configured for blending at least two materials according to the at least one item of blending information onto at least one substrate. In particular, the printing device may be configured for blending the at least two materials according to the item of blending information, thereby e.g. generating the blend, onto a substrate for receiving the blend. With respect to embodiments of the printing device and the generating of the encryption key reference is made to PCT/EP2020/066628, the full content is included herein by reference.

The term "material" as used herein is a broad term and is to be given its ordinary and customary meaning to a person of ordinary skill in the art and is not to be limited to a special or customized meaning. The term specifically may refer, without limitation, to a chemical element or a chemical compound, specifically a chemical element or a chemical compound being capable of mixing with other chemical elements or chemical compounds. The material specifically may be suitable for pouring. The material generally may be in one or more of a solid state, specifically a granular solid state, a liquid state or a gaseous state. Specifically, the material may be or may comprise at least one of a powder or a liquid. The material may be a homogeneous, unitary material. Alternatively, the material may also comprise a plurality of components which are mixed homogeneously or inhomogeneously. Thus, the material may be a mixture or a composite by itself. As an example, the material may be or may comprise a liquid, wherein the liquid, as an example, comprise at least one solvent and at least one chemical compound dissolved, emulsified or dispersed in the at least one solvent. The solvent may form part of the material, or, alternatively, the at least one chemical compound may be considered the material, whereas the solvent may simply be considered as an adjuvant or additive to the material.

The at least two materials blended specifically may be different materials, specifically materials being different with respect to at least one property selected from the group consisting of: a chemical property, specifically a chemical composition; an optical property, specifically an optical appearance such as one or more of a color, a transparency, a brilliance; a mechanical property, specifically one or more of granularity, particle size, density, viscosity or flowing properties; an electrostatic chargeability; a compressibility; a crystallinity; a particle shape. Still, additionally or alternatively, other properties may be used.

The at least two materials specifically may comprise bulk materials and/or loose materials. The at least two materials, independently, each may be selected from the group consisting of solid materials, gaseous materials and liquid materials. More specifically, the at least two materials, independently, may be selected from the group consisting of and/or may comprise at least two materials selected from the group consisting of:

- a powder, specifically a powder selected from the group consisting of:
  - an inorganic powder, specifically an inorganic powder made of a mineral;
  - an organic powder, specifically an organic powder made of a polymer;
  - a pigment;
  - a toner powder a liquid, specifically a liquid selected from the group consisting of a pure liquid, a suspension, an emulsion or a solution, more specifically one or more of a liquid color and an ink.

The terms material and pigment may be used herein as synonyms. Thus, the term pigment may comprise a color particle, a powder, a liquid comprising these particles. The term pigment may comprise pure pigments and/or pigments having at least one polymer coating, e.g. of styrene acrylate copolymer, polyester resin, styrene butadiene copolymer, or similar polymers. Specifically, the term pigment may refer to toner powders. In the context of the present invention, any suitable pigment can be used. It is also possible to use mixtures, e.g. comprising one or more pigments or toner powders of one or more pigments in the context of the present invention.

In the context of the present invention, the amount of the pigments used may vary. Preferably, the amount of pigments used is in the range of from $10^{-15}$ g/cm$^2$ to 1 g/cm$^2$, more preferable in the range of from $10^{-9}$ g/cm$^2$ to $10^{-3}$ g/cm$^2$.

The particle size of the pigments used preferably is in the range of from 10 nanometer to 1 mm, preferably, in particular in the range of from 100 nanometer to 100 micrometer.

Preferably, suitable pigments are selected from inorganic materials, preferably from metal oxides, metal oxides, preferably metal oxides from natural sources. Suitable may for example be pigments selected from iron oxides. Iron oxide pigments are relatively low-cost materials that resist color change due to exposure to sunlight, have good chemical resistance and are stable under normal ambient conditions. It has been found that iron oxides are particularly suitable since the materials can easily be recycled and reused. Iron oxide pigments can for example be collected and can be used as feedstock for steel production leading to the avoidance of disposal of used pigment as waste.

Suitable iron oxides are also available as natural pigments. Suitable red pigments may be derived from hematite, yellow and brown pigments, such as ochres, sierras and umbers, may be derived from limonite, and magnetite provides a black iron oxide pigment. Furthermore, synthetic pigments, in particular metal oxides such as iron oxides, which are manufactured under controlled conditions such that particle size, distribution and shape resulting in superior uniformity, may be used according to the present invention to improve color quality and chemical purity.

For example, pigments from natural sources are suitable for the method of the present invention such as pigments selected from natural organic materials, for example organic material from plants, animals, and minerals. Also suitable are pigments selected from synthetic organic materials such as for example azopigments. Suitable mineral pigments are for example ochre, sienna, azurite, cobalt or ultramarine. Also spinels may be used. Ochre is usually a red or yellow that is obtained from ore of iron or ferruginous clay. Sienna is a form of limonite clay that is derived from ferric oxides to produce a rich red. Azurite is found in the upper oxidized portions of copper ore deposits. Ultramarine can be obtained from lapis lazuli or can be artificially manufactured. Spinels are available in yellow, orange, turquoise, and blue. Further examples include: carmine lake natural red 4 (cochineal), natural yellow 3 lake (from plants), madder lake natural red 9 (madder root), indigo lake natural blue 2 (woad), chlorophyllin green lake (plant matter), vegetable or bone black, titanium white, iron oxides, talc, chalk, kaolin and other earth pigments.

According to a further embodiment of the present invention, preferably at least 20%, more preferably 30%, and most preferably 40%, of the pigments used should be of natural origin, i.e. derived from natural products, other than products of the petrochemical industry, by simple separation or purification steps.

In the context of the present invention the term pigments also comprises pigments which are visible under UV light. Sustainable and eco friendly materials may be used such as pigments from Clariant available under the Ecotrain label, for example pigments selected from the group of Novoperm Yellow HR 72, Hostaperm Blue B2G 03, Hostaperm Green GNX 01, Hansa Brilliant Yellow 2GX 72-S, Hostaperm Yellow H3G EDW VP 5131, https://www.clariant.com/de/Solutions/Products/2014/10/14/10/39/Novoperm-Orange-HL-71"\o"Novoperm Orange HL 71, and Hostaperm Blue B2G-EDS VP 3491.

In the context of the present invention, it is also possible to use effect pigments such as for example absorption pigments, metal effect pigments, and pearlescent pigments. Metal effect pigments or metallic effect pigments usually consist of flakes or platelets of aluminum, copper, copper-zinc alloys, zinc and other metals. Suitable pearlescent pigments are for example mica-based pigments, but also pigments based on silica or alumina flakes. Suitable are for example pigments of natural mica coated with thin films of metal oxides such as $TiO_2$ or iron oxide. Furthermore, pigments based on silica flakes ($SiO_2$) or alumina ($Al_2O_3$) based pigments can be used in the context of the invention. Suitable substrate-free pearlescent pigments are for example natural pearl essence, basic lead carbonate, bismuth oxychloride, micaceous iron oxide and $TiO_2$ flakes.

The term "blending" as used herein is a broad term and is to be given its ordinary and customary meaning to a person of ordinary skill in the art and is not to be limited to a special or customized meaning. The term specifically may refer, without limitation, to the process of mixing the at least two materials in a defined manner, thereby creating a blend. The mixing take place in various ways, in accordance with the nature of the at least two materials. As an example, in case the at least two materials comprise powders, the mixing may involve co-dispensing or subsequently dispensing the powders into a common receptacle, including the option of stirring the mixture. Additionally or alternatively, in case the at least two materials comprise liquids, the mixing may also involve co-dispensing or subsequently dispensing the liquids into a common receptacle, including the option of stirring the mixture. Additionally or alternatively, as will be outlined in further detail below, the mixing may also comprise printing processes, e.g. inkjet printing of the at least two materials, e.g. onto a common substrate. Additionally or alternatively, the blending may comprise other types of mixing processes of the at least two materials, such as mixing the at least two materials on at least one common substrate. As an example, the blending may comprise one or more electrostatic precipitation processes, such as electrostatic precipitation of the at least two materials, e.g. onto a common substrate, e.g. onto an electrostatic charged surface. Thus, specifically, the blending and/or mixing may comprise electrostatic precipitation in printing processes. For example, the blending and/or mixing may comprise electrostatic precipitation in printing processes of at least two electrostatic charged materials onto an electrostatic neutralized surface. Thus, the materials may be mixed, thereby at least temporarily changing their electrical charges. Specifically, the blending and/or mixing may comprise electrostatic precipitation in laser printing processes, such as processes typically performed in a laser printer. In particular, the at least two materials, e.g. the pigments, may for example firstly be electrostatically charged and deposited on an equally charged image roll where specific areas have been electrostatically neutralized, e.g. by using a laser and/or LED. These deposited materials may, as an example, then be drawn and/or removed off the image roll by a reversely charged substrate, such as by a reversely charged paper.

The blending may leave the materials unchanged or may also fully or partially change the nature of the materials. Thus, as an example, the materials may simply be mixed without any chemical changes. Additionally or alternatively, the materials may be mixed, thereby changing their chemical nature. The latter specifically may take place in case the materials contain solvents which, during the blending or afterwards, may fully or partially evaporate. Again, additionally or alternatively, the materials may also fully or partially react with each other, thereby generating at least one reaction product.

The term "blend" as used herein is a broad term and is to be given its ordinary and customary meaning to a person of ordinary skill in the art and is not to be limited to a special or customized meaning. The term specifically may refer, without limitation, to a mixture of the at least two materials. The mixture specifically may be present in at least one receptacle and/or on at least one substrate. The mixture generally may be in one or more of a solid state, specifically a granular solid state, a liquid state or a gaseous state. Specifically, the mixture may be or may comprise at least one of a powder or a liquid. The mixture may be in the same state as the materials or may be in a different state. As an example, at least one of the materials may be in a liquid state, wherein the mixture may also be in a solid state, which may be the case e.g. after a drying process. Thus, as an example, the at least two materials may be mixed in the blending process in a liquid state, wherein, afterwards, a drying may take place, thereby evaporating at least one solvent and/or thereby changing the chemical nature of the mixed materials. As an example, the mixing process may imply a printing of the at least two materials in a liquid state onto at least one substrate, followed by a drying or setting process, wherein the blend, consequently, may be in a dried or solid state. Other examples may imply a phase change process, such as a curing or a solidifying of the materials after mixture.

The term "item of blending information" as used herein is a broad term and is to be given its ordinary and customary meaning to a person of ordinary skill in the art and is not to be limited to a special or customized meaning. The term specifically may refer, without limitation, to at least one item of information describing a defined blending process. The at least one item of blending information may refer to the process of blending itself, such as to the way the at least two materials are mixed, e.g. to process parameters of the mixing process. Additionally or alternatively, the at least one item of blending information, as will also be outlined in further detail below, may also refer to the materials for blending, such as to quantities to be mixed in the blending process, e.g. to masses or volumes of the materials.

The at least one item of blending information specifically may comprise n blending variables, wherein n denotes a positive integer. The term "blending variable" as used herein is a broad term and is to be given its ordinary and customary meaning to a person of ordinary skill in the art and is not to be limited to a special or customized meaning. The term specifically may refer, without limitation, to a variable which either quantitatively or qualitatively describes at least one aspect or parameter of the blending. As an example, the blending variable may refer to the at least two materials, to detect of the blending process such as quantities or material streams for mixture or the like. Further, in the scanning process, m material properties of the blend may be detected, with m being a positive integer. Specifically, the number m of material properties detected may be as large or larger than the number n of blending variables. In other words, preferably, $m \geq n$. In still other words, specifically, the information generated in the scanning step. may be at least as large as the information used for the printing step, wherein the term "information" may refer to the numbers n and m, respectively, and/or may generally refer to the number of degrees of freedom and/or to the logarithm of the degrees of freedom, such as log n or log m, respectively.

The at least one item of blending information specifically may comprise at least one of: quantities for the at least two materials to be blended; weights for the at least two materials to be blended; volumes of the at least two materials to be blended; a blending ratio of volumes of the at least two materials to be blended; a blending ratio of weights of the at least two materials to be blended; mixing instructions for mixing two or more continuous or discontinuous streams of the at least two materials to be blended; printing instructions for blending the at least two materials to be blended, such as a tilting information for blending the at least two materials to be blended using differently tilted raster images, e.g. raster images generated by a raster image processor (RIP) of a printer. Still, additionally or alternatively, other types of blending information may also be used.

The at least two materials may be fed into the blending device continuously or discontinuously. Thus, as an example, the blending device may comprise at least two reservoirs for the at least two materials to be blended. Additionally or alternatively, however, other means of feeding the materials into the at least one blending device are also possible. Thus, as an example, a continuous feeding is also possible, in addition or alternatively to using at least one reservoir for at least one of the materials.

The term "blending device" as used herein is a broad term and is to be given its ordinary and customary meaning to a person of ordinary skill in the art and is not to be limited to a special or customized meaning. The term specifically may refer, without limitation, to a device which is configured for performing the above described blending process. Specifically, the blending device may comprise at least one of a feed or a reservoir for each of the materials. The blending device may also comprise at least one blending element, such as at least one of a nozzle, a stirring device, a printer, a mixer or the like.

The term "blend" as used herein is also a broad term and is to be given its ordinary and customary meaning to a person of ordinary skill in the art and is not to be limited to a special or customized meaning. The term specifically may refer, without limitation, to a mixture of at least two materials. The blend specifically may be present on a substrate or in a receptacle. The blend specifically may comprise a finite amount of the materials.

The blending device may further comprise at least one receiving element for receiving the blend. As used herein, the term "receiving element" may generally refer to an arbitrary element configured for receiving the blend. The receiving element specifically may have at least one receiving surface and/or at least one receiving material for receiving the blend. Thus, as an example, the at least one receiving element specifically may comprise at least one element selected from the group consisting of: a receiving vessel for receiving the blend; a substrate for receiving the blend. The at least one receiving element may be a stationary receiving element and/or maybe a moving receiving element, such as a rotatable receiving element. As an example, the receiving element may comprise at least one substrate, such as a substrate having at least one substrate surface which may be or may comprise a planar substrate surface and/or which may be or may comprise a curved substrate surface. As an example, the receiving element may comprise at least one drum having a receiving surface for receiving the blend, such as a rotating drum. The blend, by using the blending device, specifically may be deposited directly or indirectly on to the rotating drum. As an example, a drum may be used on which the blend is temporarily secured, such as electrostatically. These electrostatic drums are generally known in the technical field of printing, such as laser printing.

In case the receiving element comprises at least one drum, the drum specifically may be a rotating drum. Therein, the method may further comprise at least one cleaning step in which, after detecting the at least one material property, the blend specifically may be removed from the receiving surface of the drum. As an example, powders and/or pigments may be dispensed onto a rotating drum and may be, as an example, temporarily secured to the surface of the rotating drum by electrostatic forces. During that time of securing the blend to the surface of the rotating drum, the at least one material property of the blend on the surface might be detected, e.g. by optical reading. As an example and as will be outlined in further detail below, colors may be detected and, subsequently, may, as an example, be transformed into binary information, such as a binary row of numbers. Subsequently, the drum may be cleaned, such as by rotating into a cleaning position, e.g. by rotating the drum by 90°.

A similar procedure, optionally without the securing by electrostatic forces, may also be performed by using inkjet printing, either directly onto the surface of a drum and/or onto a moving substrate, such as onto a paper substrate. The drum, after detecting the at least one property, may be cleaned for reuse. Thus, as an example, the blending device may comprise at least one inkjet printer. The materials may be or may comprise inkjet printing of the materials, which may be or may comprise liquid materials, onto the at least one receiving element, such as onto the at least one rotating drum and/or onto at least one substrate. Subsequently, the detection of the at least one material property may take place, such as of the at least one optical property, e.g. by optical reading. As an example, again, colors may be detected and, subsequently, may, as an example, be transformed into binary information, such as a binary row of numbers. Subsequently, the drum may be cleaned, such as by rotating into a cleaning position, e.g. by rotating the drum by 90°. Additionally or alternatively, besides cleaning the at least one receiving element, a new receiving element or a new part of the receiving element may be used for further steps, such as for further printing and for repeating the blending and the detecting.

The blending device specifically may comprise at least one blending element for generating the blend. The term "blending element" as used herein is a broad term and is to be given its ordinary and customary meaning to a person of ordinary skill in the art and is not to be limited to a special or customized meaning. The term specifically may refer, without limitation, to an arbitrary element, device or combination of elements configured for blending the at least two materials, specifically by mixing the at least two materials, e.g. before, during or after deposition onto the at least one optional receiving element. As an example, the at least one blending element may be or may comprise at least one element selected from the group consisting of: a dispenser for continuously or discontinuously dispensing at least one of the two materials; a printer for printing the at least two materials onto at least one receiving element, specifically onto at least one substrate, specifically at least one printer selected from the group consisting of: an inkjet printer, a laser printer. Still, additionally or alternatively, other types of blending elements may be used. Thus, as an example, the blending element may be or may comprise at least one of a stirring element, a dispenser, a nozzle, an extruder.

The scanning of the mixed pigments may comprise detecting at least one optical signal, in particular at least one material property, of the blend by using the at least one detector. The term "material property" as used herein is a broad term and is to be given its ordinary and customary meaning to a person of ordinary skill in the art and is not to be limited to a special or customized meaning. The term specifically may refer, without limitation, to an arbitrary property of a material, such as of the blend. The property specifically may refer to one or more of a physical, a chemical or a biological property. Specifically, the material property may comprise at least one of a mechanical property or an optical property of the material. The material property specifically may refer to a measurable property of the respective material.

The at least one optical signal may comprise a wide variety of detectable properties of the blend. Specifically, the material property may be chosen such that the material property is not directly derivable from a combination of material properties of the at least two materials, such that the material property of the blend is hardly predictable, e.g. due to chaotic processes, nonlinear behavior or other unpredictable processes during the blending. Specifically, amorphous materials such as powders, when being blended, often lead to mixtures having unpredictable properties, such as density or distribution of the original materials in the blend. Specifically, the at least one material property detected may be or may comprise at least one of a physical property of the blend and a chemical property of the blend. More specifically, the at least one material property may be or may comprise at least one property selected from the group consisting of: a specific density of the blend; a volume of the blend; a weight of the blend; an optical property of the blend; a color of the blend; a spectral composition of the blend, specifically a color spectrum of the blend; a color intensity of the blend; a viscosity of the blend. Other material properties may be used alternatively or additionally.

The term "detecting" as used herein is a broad term and is to be given its ordinary and customary meaning to a person of ordinary skill in the art and is not to be limited to a special or customized meaning. The term specifically may refer, without limitation, to the process of generating information on a property or measurable variable, wherein qualitative and/or quantitative information may be retrieved. The term specifically may refer to the process of measuring at least one measurable variable of an object. Consequently, the term "detector" as used herein is a broad term and is to be given its ordinary and customary meaning to a person of ordinary skill in the art and is not to be limited to a special or customized meaning. The term specifically may refer, without limitation, to an arbitrary device configured for performing the detecting process, such as a device having at least one sensor for measuring the at least one measurable variable of the object. As an example, the sensor may comprise one or more of: a weight sensor, specifically a scale; a volume sensor; a density sensor; a color sensor; a particle size distribution sensor. Other sensors may be used in addition or alternatively.

The step of detecting the at least one optical signal, in particular the material property of the blend, specifically may comprise generating at least one item of measurement information on the material property. Thus, the at least one item of measurement information may generally refer to the result of a measurement of the at least one material property, such as to at least one numerical measurement value indicating the at least one material property of the blend or being characteristic for the at least one material property of the blend. Thus, as an example, the at least one item of measurement information may, as an example, comprise at least one of the following items of information: a specific density measurement value of the blend; a volume measurement value of the blend; a weight measurement value of the blend; an optical property measurement value of the blend; a color measurement value of the blend; a spectral composition measurement value of the blend, specifically a color spectrum measurement value of the blend; a color intensity measurement value of the blend; a viscosity measurement value of the blend. These measurement values might as an example each may be or may comprise a single number or a plurality of numbers, such as distributions, spectra or the like. Specifically, the at least one item of measurement information may be or may comprise at least one numerical value such as a digital value.

The step of detecting the at least one optical signal may comprise using at least one scanning device of the printing device. The term "scanning device" as used herein is a broad term and is to be given its ordinary and customary meaning to a person of ordinary skill in the art and is not to be limited to a special or customized meaning. The term specifically may refer, without limitation, to a device configured for detecting at least one property of at least one object and/or element, e.g. of a blend. In particular, the scanning device may be configured for examining and/or detecting at least one material property of the blend. As an example, the scanning device may have at least one scanning element configured for optically recording and/or capturing spatially resolved one-dimensional, two-dimensional or even three-dimensional optical information on the blend. Thus, e.g. for optical detection, the scanning device may, for example, comprise at least one sensor, such as optical sensors, specifically image sensors, e.g. at least one light sensitive capacitor, at least one charge-coupled device (CCD). The scanning device may for example comprise at least one CCD-chip and/or at least one CMOS chip. Specifically, the scanning device may be configured for detecting optical signals of the blend, e.g. of the blended and/or merged powder components, such as by using an optical system. In particular, the scanning device may be configured for convert, e.g. break down, the optical signals of the blend into primary colors, such as into red, green and blue, e.g. by using a prism. The scanning device may specifically be configured for converting the optical signals, such as the optical signals converted into primary colors, into at least one digital image, e.g. by using at least one sensor, such as a sensor comprising a plurality of light-sensitive capacitors. Further, the scanning device may comprise at least one illuminating element, such as an element configured for illuminating the blend, wherein the scanning device may be configured for detecting the at least one property of the blend by using a reflection of the blend. Herein, the scanning device may also be referred to as scanner. The scanning device may specifically be or may comprise a device selected from the group consisting of: a CCD scanner; a CIS scanner; a camera; a film.

In particular, the scanning device may comprise at least one optical detection system, specifically comprising one or more of an optical detector, an image sensor, for example a photomultiplier tube (PMT), e.g. a vacuum tube converting incident photons into an electric signal, a silicon photomultiplier (SiPM), e.g. a solid-state device converting incident photons into an electric signal.

The scanning device may specifically be configured for generating at least one item of measurement information on the material property. In particular, the scanning device, when detecting the at least one material property of the blend, the scanning device may generate the at least one item of measurement information on the material property of the blend. In particular, the image, such as the digital image, taken by using the scanning device may comprise at least one binary code, wherein at least a part of the binary code may be used for generating at least a part of the encryption key.

The transforming of the at least one optical signal into the at least one encryption key may take place in a computer-implemented fashion. Thus, as outlined above, the transforming of the at least one optical signal into the at least one encryption key takes place by using at least one data processing device configured for applying the at least one transformation algorithm to the optical signal. The term "data processing device" as used herein is a broad term and is to be given its ordinary and customary meaning to a person of ordinary skill in the art and is not to be limited to a special or customized meaning. The term specifically may refer, without limitation, to a computer or a computer system, having at least one processor and optionally having at least one data storage device. Therein, the processor, as an example, may comprise at least one integrated circuit configured for executing computer readable instructions. The processor, additionally or alternatively, may also be or may comprise at least one application-specific integrated circuit and/or at least one field-programmable gate array. The configuration of the data processing device for applying the at least one transformation algorithm, as an example, may be performed by providing a plurality of computer-readable instructions to the data processing device, e.g. via at least one data storage device and/or via at least one interface.

The term "processor" as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of an electronic device or system, and/or, generally, to a device which is configured for performing calculations or logic operations. In particular, the processor may be configured for processing basic instructions that drive the device or system, such as a computer. As an example, the processor may comprise at least one arithmetic logic unit (ALU), at least one floating-point unit (FPU), such as a math coprocessor or a numeric coprocessor, a plurality of registers, specifically registers configured for supplying operands to the ALU and storing results of operations, and a memory, such as an L1 and L2 cache memory.

The term "algorithm" as used herein is a broad term and is to be given its ordinary and customary meaning to a person of ordinary skill in the art and is not to be limited to a special or customized meaning. The term specifically may refer, without limitation, to a plurality of process steps to be performed subsequently and/or in parallel. The algorithm specifically may comprise one or more mathematical operations to be applied to at least one input variable. Consequently, the term "transformation algorithm" specifically may refer to an algorithm which performs a transforming process for transforming the material property into the encryption key by using one or more mathematical operations to be applied to the at least one input variable.

The transforming of the optical signal, in particular the material property, into the encryption key, specifically may comprise subjecting the at least one material property to at least one test, specifically to at least one predetermined test. As an example, the at least one test may be or may comprise comparing the at least one material property directly or indirectly, such as by using the at least one item of measurement information, with at least one comparison value, at least one comparison value range or the like. Other mathematical tests are generally feasible and may also be applied. In accordance with the result of the at least one test, the encryption key or at least a part thereof may be generated. The transforming of the material property into the encryption key specifically may comprise comparing the at least one material property, including the option of using the at least one item of measurement information representing the material property, with at least one threshold value. In accordance with the result of this comparison, at least one number may be assigned to the material property. The number specifically may be a binary number. The number may directly form the encryption key or may form part of the encryption key. Thus, as an example, the encryption key may comprise a plurality of its values, wherein at least one of the bit values is assigned in accordance with the result of a comparison of a material property with at least one threshold value. As an example and as will be outlined in further detail below, a spectrum or distribution of at least one material property of the blend may be measured, such as a distribution of colors. In accordance with e.g. the statistical occurrence of a specific color or with the statistical occurrence of another specific feature or property of the blend, a specific bit value may be chosen. Other bit values may be chosen accordingly, e.g. in accordance with other specific features of properties of the blend. Thereby, the full encryption key or at least a part thereof may be generated.

The transformation of the optical signal into the encryption key may take place in a single step or in a plurality of steps. Thus, as will be outlined in further detail below, the printing, the scanning and the transforming each may be performed only once, wherein the result of the scanning is directly transformed into the final encryption key. Alternatively, however, one or more of or even all of the method steps of printing, scanning and transforming may be performed repeatedly, e.g. by generating one or more intermediate encryption keys, which, again, are used for additional printing and detecting steps, until, finally, the final encryption key is generated.

The transforming of the optical signal into the encryption key, as an example, may take place by providing at least one electronic signal, such as digital information, representative for the at least one optical signal to the at least one data processing device for further processing. Thus, as an example, the detector may directly or indirectly communicate with the data processing device or may even be part of the data processing device. Thus, the at least one optical signal may directly or indirectly be provided to the data processing device for further processing and four directly or, after preprocessing, applying the at least one transformation algorithm.

The result of the transforming process may be the encryption key, wherein the encryption key, as an example, may be provided in an electronic fashion. As an example, the encryption key may be or may comprise electronic information in a digital or analogue format. The encryption key, as an example, may be provided to one or more of a data storage device, and interface, a third-party or the like.

Further, the scanning device may be configured for use as a transforming device in the encryption key generating device. The scanning device may be configured for subjecting the at least one material property to at least one test. The test may specifically be or may comprise at least one predetermined test. Thus, the scanning device may be configured for subjecting the at least one material property to at least one predetermined test. By subjecting the at least one material property to the at least one test, the encryption key may be generated in accordance with the result of the test. In particular, the scanning device, when subjecting the at least one material property to the at least one test, may generate the at least one encryption key in accordance with the result of the at least one test.

The scanning device may specifically be configured for comparing the at least one material property with at least one threshold value and assigning a number in accordance with the result of the comparison. In particular, the scanning device may be configured for comparing the at least one material property with at least one threshold value and assigning a number in accordance with the result of the comparison, when transforming the material property into the encryption key.

Further, the scanning device may be configured for optically scanning, the substrate, e.g. the carrier medium, onto which the printer, specifically the printing device as described above or as described in further detail below, blended the at least two materials.

The scanning device may further be configured for being used complementary to the printer, specifically complementary to the printer as described above or as described in further detail below. In particular, the scanning device and the printer in conjunction may be configured for being used as the encryption key generating device as describes above or as described in further detail below.

The generating of the encryption key may be fully or partially computer-implemented. Thus, specifically, the transforming may fully or partially be automated and/or performed in a computer-implemented fashion.

The present invention proposes applying the complexity of powder physics where particles of small size, e.g. of sizes from 1 to 10 μm, are behaving reproducible, but unpredictable due the interactions very hard to measure. Hence, this technology applies according to the principle of physical unclonable function, PUF. Specifically, the present invention proposes to enhance the laser printer technology where billions of CMYK pigment particles are mixed. Optical information of the colors of pigment dots may be used and may be transferred into binary information. The entire pigment production of the world (>10 million tons) would be needed to be printed to generate all possible keys.

The encryption key generation according to the present invention, as outlined above, may be based on changing the printer control in encryption mode, as the first part of the key, and performing printer jobs, as the second part of the key, to achieve new unknown optical effects. The new generated optical signals may be scanned inside of the printing device and generated new digital RGB pictures are converted to the binary keys. The physical pictures may be produced only on a transfer belt, which is cleaned afterwards, such that the information about the picture never leaves the printing device.

The proposed method according to the present invention may allow for secure distribution of generated encryption keys. The method according to the present invention comprises the following method steps which, specifically, may be performed in the given order. Still, a different order is also possible. It is further possible to perform two or more of the method steps fully or partially simultaneously. Further, one or more or even all of the method steps may be performed once or may be performed repeatedly, such as repeated once or several times. Further, the method may comprise additional method steps which are not listed.

The method comprises the following steps a) providing an initial session key information via at least one secure channel to each node, wherein the initial session key information comprises an initial printer control setting and an initial printer job setting, wherein the initial session key information is different for each node;

b) providing as one-time pad an initial session key package to each of the nodes encrypted with the respective node's initial session key information, wherein the initial session key package comprises a plurality of items of first session key information for communication of the respective receiving node with the other nodes of the communication system wherein any two nodes have a common item of first session key information;

c) generating at each node second session key information for each of the other nodes, wherein the second session key information comprises a second printer control setting and a second printer job setting, wherein the second session key information generated by the respective node for the respective other nodes is different for each of the other nodes;

d) sending a message from one of the nodes to another one of the nodes, wherein the message is encrypted with the first session key information for communication between said node and said another one of the nodes, wherein the message comprises the second session key information generated by the node sending the message for the node receiving the message such that the node sending the message and the node receiving the message are able for encrypted communication with each other.

The term "session key information" as used herein is a broad term and is to be given its ordinary and customary meaning to a person of ordinary skill in the art and is not to be limited to a special or customized meaning. The term specifically may refer, without limitation, to key generating information for the respective session of key distribution. The key distribution may comprise a plurality of sessions such as an initial session for initiating the communication system to allow secure communication between the nodes and subsequent sessions such as of individual communication between the nodes.

The term "initial session key information" as used herein is a broad term and is to be given its ordinary and customary meaning to a person of ordinary skill in the art and is not to be limited to a special or customized meaning. The term specifically may refer, without limitation, to starting key generating information. The initial session key information may be pre-defined. The initial session key information is provided to each of the nodes. The initial session key information is different for each node such that no two have identical initial session key information. The initial session key information for each node may comprise a unique combination of one initial printer control setting and one initial printer job setting. The initial session key information for each node may comprise an individual initial printer control setting and/or initial printer job setting for the respective node. For example, the communication system may comprise m nodes, denoted as nodes i=1 to m with m>1. For initiating said exemplary communication system comprising nodes i=1 to m with m>1, the method may comprise providing initial session key information ks_i,0 to the respective node i.

For each node information about the initial printer job (e.g. "1.023.674") and the initial printer setting (e.g. "124.986.234") can be securely distributed and can be used for the printing device of the respective node. The initial printer job and the initial printer setting may be given as hexadecimal numbers such as F9EBA and 773237A.

The term "secure channel" as used herein is a broad term and is to be given its ordinary and customary meaning to a person of ordinary skill in the art and is not to be limited to a special or customized meaning. The term specifically may refer, without limitation, to a channel for transmission being accessible only for the transmitting entity and the receiving entity but not to third parties. The secure channel may be or may comprise one or more of the postal service, a telephone connection, a SMS, video conference call (where the number is shown) or there like. The term "providing via at least one secure channel" as used herein is a broad term and is to be given its ordinary and customary meaning to a person of ordinary skill in the art and is not to be limited to a special or customized meaning. The term specifically may refer, without limitation, to distributing the initial session key information via the secure channel. The secure distribution of the initial session key information may be done separately, which comprises also the separate distribution of the initial printer control setting and of the initial printer job information.

The key generating information for generating encryption keys, in particular standard printer cartridges, printer jobs and printer control settings and algorithms may be distributed publicly. Just the initial session key information is exchanged secretly via the secure channel, which is of very small amount of data.

The term "initial session key package" for a node as used herein is a broad term and is to be given its ordinary and customary meaning to a person of ordinary skill in the art and is not to be limited to a special or customized meaning. The term specifically may refer, without limitation, to a set of items of first session key information comprising a list of unique combination of one initial printer control setting and one initial printer job setting for communication of the respective node with the other nodes of the communication system. An item of first session key information may refer to generating key information required for secure communication between the respective node and one of the other nodes. Two nodes have one item of first session key information in common, respectively. The other items of first session key information of the respectively received initial session key package differ between the nodes. Specifically, the initial session key package may be provided to each node by at least one center hub.

The term "one-time pad" (OTP) as used herein is a broad term and is to be given its ordinary and customary meaning to a person of ordinary skill in the art and is not to be limited to a special or customized meaning. The term specifically may refer, without limitation, to a symmetric encryption technique in which a one-time pre-shared key is used only once to encrypt a single message. A unique initial session key package may be provided encrypted with the respective node's initial session key information to the respective node. For example, for the exemplary communication system comprising nodes i=1 to m with m>1, a unique initial session key package may be provided to each of the nodes by the center hub encrypted with the respective node's initial session key information to the respective node. Specifically, for the respective node i, the initial session key package is encrypted with the node's key KS_i,0 generated from ks_i,0. Step b) may comprise decrypting the initial session key package using the respective node's key KS_i,0. The initial session key package may comprise for the respective node i a set of the first session key information ks_i,i+j with j=1 to (m−i). The initial session key package may comprise for the respective node i+1 a set of the first session key information ks_i,i+1, ks_i+1,(i+1)+j with j=1 to (m−i). Thus, after step b), pairs of nodes share the respective first session key information for communication with each other.

In step c) at each node second session key information for each of the other nodes is generated. An algorithmic random number generator may be used for generating of the second session key information, in particular for generating numbers for a second printer control setting and a second printer job. The second session key information, in particular the combination of second printer control setting and second printer job, may be different from the initial session key information. In particular, node i may generate for communication with node i+1 second key information ks_i+1,i. For example, node i may generate for communication with node m second key information ks_m,i. Each of the nodes may comprise an algorithmic random number generator. The algorithmic random number generators of the nodes may work asynchronous.

Step d) comprises sending a message from one of the nodes to another one of the nodes, wherein the message is encrypted with the first session key information for communication between said node and said another one of the nodes, wherein the message comprises the second session key information generated by the node sending the message for the node receiving the message such that the node sending the message and the node receiving the message are able for encrypted communication with each other. Step d) may be repeated by all nodes of the communication system using the respective first session key information and second session key information. As the pairs of nodes share the respective first session key information for communication with each other encrypted communication between all nodes of the communication system is possible. After step d) the communication system may be autarkic without any further key distribution, since the second session key information is provided together with the message.

To avoid the occurrence of any transmission failure, each digit of the individual number assigned to each of the possible printer control settings and possible printer jobs may be encrypted in multiple way, e.g. printer job number 1254387 is converted to printer job number 111222555444333888777. In case of a transmission failure of one digit, e.g. a "2" becomes a "§ ", the two other individually transmitted "2" may be override the wrong information.

For further enhancing robustness of the name of the printer job may be converted from numbers into words such as "1.023.674" into "one zero two three six seven four". This may allow autocorrection in case of errors in key generating (e.g. one->on&).

According to PCT/EP2020/066628, the full content is included herein by reference, solid particle bulks of small particle size behave in replicable, but unpredictable way, so they are applied to achieve optical signals to generate encryption keys in pseudo-randomized fashion. Because of these properties, the proposed encryption technology behaves according to PUFs, and the symmetric key generation process according to the present invention can be classified as PUF.

The generation of symmetric encryption keys as described above may allow encryption keys of more than 1 Mbit length. The large entropy of the approach according to the present invention may allows key distribution in a public way. Due to Mbit key length, the key generation information can be encrypted together with the same key as for the message. The proposed onetime-pad approach may allow quantum computer secure encryption. By using the long initial session key KS_i,0 it may be possible to encrypt all key generating information ks_i,i+j for all nodes all at once such that it is possible to communication to all nodes their complete initial session key package using an OTP-approach.

Usually, starting symmetric encryption systems require the distribution of information about the setting or program of the system key, which is typically of that size of data, which cannot be entered manually at the nodes. This means for the system key that its very sensitive information about the system key setting needs to be exchanged in a digital way via an unsecure channel, before the symmetric encryption system has entered in the secure operation mode. Typically, for establishing a symmetric encryption system, public-key cryptosystems as the RSA encryption system are applied to perform the first step of data transfer. As the public-key cryptosystems are losing their security performance in context of the development of more and more powerful quantum computers, the step of establishing the system key of a symmetric encryption system becomes a risk. Besides, the high amount of encryption keys of (n/n−1)/2 to be distributed between n nodes requires significant flexibility of the encryption system, which adds also to a significant inconvenience for the users. The present invention proposes a new cryptographic system and approach, which is secure against fully developed quantum computing as described in PCT/EP2020/066628, and delivers the similar comfort for key distribution as asymmetric systems as the RSA technology. This may be possible by applying the complexity of powder physics, where particles of small size (1-10 μm) are behaving reproducible, but unpredictable due the interactions very hard to measure. The laser printer technology, where billions of CMYK pigment particles are mixed, it may be possible to deliver optical results according to principles of physical unclonable functions, PUF and to transfer this into binary information. The high amount of possibilities to generate different optical information for each pigment dot of a pixel, it may be possible to obtain a very large entropy. This may be possible as our system allows the combination of billions of printing source, in particular digital pictures from physical objects, and billions of printer control settings, in particular as the composition of each pigment dot can be controlled individually by the printer. Hence, the proposed physical-optical approach may allow the generation of symmetric keys of more than 1 Mbit just by printing an image of a size smaller than a DIN-A4 picture. Furthermore, the entropy of the proposed approach may allow key distribution in a public way as more than the entire pigment production of the world (>10 million tons) would be needed to generate all possible keys just applying the 4 different pigments of the CMYK color system. Thus, the key distribution approach may be based on two individual keys: changing the printer control in encryption mode (1st part of the key) and performing printer jobs (2nd part of the key) to achieve new unknown optical effects following the principle of PUF. Especially, the significant length of the session keys, possibly larger than Mbit key length, may allow the sensitive distribution of all key generation information between the nodes according to the mathematical proven secure one-time-pad approach. Also, after the encryption system is established the session key generation information to generate the next session key in the communication process can be encrypted with the message as the currently applied session key is longer than the session key generation.

In a further aspect of the present invention, a communication system comprising a plurality of nodes is disclosed.

Each of the nodes comprises a printing device configured for generating at least one encryption key for encrypting data based on changing printer control setting and printer job. Each node comprises information about possible printer control settings and possible printer jobs. The communication system is configured for providing an initial session key information via at least one secure channel to each node. The initial session key information comprises an initial printer control setting and an initial printer job setting. The initial session key information is different for each node. The communication system comprises at least one center hub configured for providing as one-time pad an initial session key package to each of the nodes encrypted with the respective node's initial session key information. The initial session key package comprises a plurality of items of first session key information for communication of the respective receiving node with the other nodes of the communication system. Any two nodes have a common item of first session key information. Each of the nodes is configured for generating at each node second session key information for each of the other nodes. The second session key information comprises a second printer control setting and a second printer job setting. The second session key information generated by the respective node for the respective other nodes is different for each of the other nodes. Each of the nodes is configured for sending a message from one of the nodes to another one of the nodes, wherein the message is encrypted with the first session key information for communication between said node and said another one of the nodes. The message comprises the second session key information generated by the node sending the message for the node receiving the message such that the node sending the message and the node receiving the message are able for encrypted communication with each other.

The communication system may be configured for performing a computer-implemented method for distributing symmetric encryption keys in a communication system comprising a plurality of nodes according to the present invention. For further optional details and for possible definitions of the terms used herein, reference may be made to the description given above.

In a further aspect, a computer program including computer-executable instructions for performing the method according to the present invention when the computer program is executed on a computer or computer network. Specifically, the computer program may be stored on a computer-readable data carrier and/or on a computer-readable storage medium.

As used herein, the terms "computer-readable data carrier" and "computer-readable storage medium" specifically may refer to non-transitory data storage means, such as a hard-ware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps as indicated above may be performed by using a computer or a computer network, preferably by using a computer program.

Further disclosed and proposed herein is a computer program product having program code means, in order to perform the method according to the present invention in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the invention, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work.

Specifically, further disclosed herein are:

- a computer or computer network comprising at least one processor, wherein the processor is adapted to perform the method according to one of the embodiments described in this description,
- a computer loadable data structure that is adapted to perform the method according to one of the embodiments described in this description while the data structure is being executed on a computer,
- a computer program, wherein the computer program is adapted to perform the method according to one of the embodiments described in this description while the program is being executed on a computer,
- a computer program comprising program means for performing the method according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform the method according to one of the embodiments described in this description after having been loaded into a main and/or working storage of a computer or of a computer network, and a computer program product having program code means, wherein the program code means can be stored or are stored on a program medium, for performing the method according to one of the embodiments described in this description, if the program code means are executed on a computer or on a computer network.

In a further aspect a use of a communication system according to the present invention for secure communication over at least one insecure channel such as the internet or radio communication is proposed. For further optional details and for possible definitions of the terms used herein, reference may be made to the description given above.

Summarizing and without excluding further possible embodiments, the following embodiments may be envisaged:

Embodiment 1 A computer-implemented method for distributing symmetric encryption keys in a communication system comprising a plurality of nodes, wherein each of the nodes comprises a printing device configured for generating at least one encryption key for encrypting data based on changing printer control setting and printer job, wherein each node comprises information about possible printer control settings and possible printer jobs, the method comprising the following steps a) providing an initial session key information via at least one secure channel to each node, wherein the initial session key information comprises an initial printer control setting and an initial printer job setting, wherein the initial session key information is different for each node;

b) providing as one-time pad an initial session key package to each of the nodes encrypted with the respective node's initial session key information, wherein the initial session key package comprises a plurality of items of first session key information for communication of the respective receiving node with the other nodes of the communication system, wherein any two nodes have a common item of first session key information;

c) generating at each node second session key information for each of the other nodes, wherein the second session key information comprises a second printer control setting and a second printer job setting, wherein the second session key information generated by the respective node for the respective other nodes is different for each of the other nodes;

d) sending a message from one of the nodes to another one of the nodes, wherein the message is encrypted with the first session key information for communication between said node and said another one of the nodes, wherein the message comprises the second session key information generated by the node sending the message for the node receiving the message such that the node sending the message and the node receiving the message are able for encrypted communication with each other.

Embodiment 2 The method according to the preceding embodiment, wherein each printer job comprises at least one digital image of at least one physical object.

Embodiment 3 The method according to the preceding embodiment, wherein the generating of the encryption key comprises selecting a printer control setting and a printer job and performing the printer job with the selected printer control setting, wherein the performing of the printer job comprises printing the digital image by mixing pigments;

scanning the mixed pigments and detecting at least one optical signal by using at least one detector of the printing device;

transforming the optical signal into the encryption key by using at least one data processing device of the printing device configured for applying at least one transformation algorithm to the optical signal.

Embodiment 4 The method according to any one of the preceding embodiments, wherein an algorithmic random number generator is used for generating of the second session key information.

Embodiment 5 The method according to any one of the preceding embodiments, wherein an individual number is assigned to each of the possible printer control settings and possible printer jobs.

Embodiment 6 The method according to any one of the preceding embodiments, wherein the possible printer control settings and the possible printer jobs are stored in a database of the printing device.

Embodiment 7 The method according to any one of the preceding embodiments, wherein the possible printer control settings comprise more than $10^6$ printer control settings and the possible printer jobs comprise about $10^6$ printer jobs.

Embodiment 8 The method according to any one of the preceding embodiments, wherein step b) comprises decrypting the initial key package using the respective node's initial session key information provided in step a).

Embodiment 9 The method according to any of the preceding embodiments, wherein in steps a) to d) of the method solely symmetric encryption is used.

Embodiment 10 A communication system comprising a plurality of nodes, wherein each of the nodes comprises a printing device configured for generating at least one encryption key for encrypting data based on changing printer control setting and printer job, wherein each node comprises information about possible printer control settings and possible printer jobs, wherein the communication system is configured for providing an initial session key information via at least one secure channel to each node, wherein the initial session key information comprises an initial printer control setting and an initial printer job setting, wherein the initial session key information is different for each node, wherein the communication system comprises at least one center hub configured for providing as one-time pad an initial session key package to each of the nodes encrypted with the respective node's initial session key information, wherein the initial session key package comprises a plurality of items of first session key information for communication of the respective receiving node with the other nodes of the communication system, wherein any two nodes have a common item of first session key information, wherein each of the nodes is configured for generating at each node second session key information for each of the other nodes, wherein the second session key information comprises a second printer control setting and a second printer job setting, wherein the second session key information generated by the respective node for the respective other nodes is different for each of the other nodes, wherein each of the nodes is configured for sending a message from one of the nodes to another one of the nodes, wherein the message is encrypted with the first session key information for communication between said node and said another one of the nodes, wherein the message comprises the second session key information generated by the node sending the message for the node receiving the message such that the node sending the message and the node receiving the message are able for encrypted communication with each other.

Embodiment 11 The communication system according to the preceding embodiment, wherein the communication system is configured for performing a computer-implemented method for distributing symmetric encryption keys in a communication system comprising a plurality of nodes according to any one of the preceding embodiments.

Embodiment 12 A computer program including computer-executable instructions for performing the method according to any one of the preceding embodiments referring to a method when the computer program is executed on a computer or computer network.

Embodiment 13 A computer-readable storage medium comprising instructions which, when the program is executed by a computer of computer network cause the computer of computer network to perform the method according to any one of the preceding embodiments referring to a method.

Embodiment 14 Use of a communication system according to any one of the preceding embodiments referring to a communication system for secure communication over at least one insecure channel such as the internet or radio communication.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

DETAILED DESCRIPTION OF THE EMBODIMENTS

Figure 1:
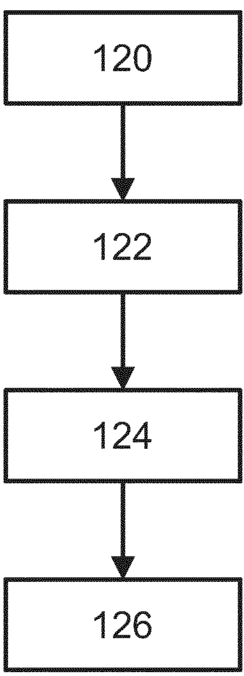
FIG. 1 shows a flowchart of an embodiment of the method according to the present invention.

In FIG. 1, a flowchart of a method computer-implemented method for distributing symmetric encryption keys in a communication system 110 comprising a plurality of nodes 112 is shown.

The encryption key may be an encryption means or decryption means used in an encryption process or in a decryption process, respectively. The encryption key may be an item of information that determines the functional output of a cryptographic algorithm such as an encryption process and/or the decryption process. Encryption keys may also specify transformations in other cryptographic algorithms, such as digital signature schemes and message authentication codes. For the process of encryption and for the process of decryption, identical keys may be used. The present invention may refer to the symmetrical encryption processes.

The distributing of encryption keys may be or may comprise at least one process of providing encryption keys from at least one sending entity or transmitter to at least one receiving entity or receiver via at least one communication means, such as at least one communication channel and/or at least one communication interface.

The communication system 110 may be a device or a combination of devices configured for transmitting data and/or configured for receiving data. Specifically, the communication system 110 may be a network comprising a plurality of nodes 112, such as at least two, preferably three, four or more, nodes 112, configured for exchanging data between the nodes 112 via at least one communication channel. The data may be or may comprise information and/or to machine-readable signals or symbols representative for information. The data specifically may be or may comprise one or both of digital data and analogue data. The data, as an example, may be stored and/or provided via at least one data storage device. The data generally may be provided in various formats. Specifically, the data may be provided in digital format and/or the data may comprise digital data. The data specifically may comprise binary data. However, other data formats are also possible. The data specifically may be subdivided into data packages. Thus, as an example, the data may comprise a plurality of data packages, each data package comprising at least one of a data header, control data and a payload portion. The data, generally, may also comprise error correction data. Thus, as an example, the error correction data may comprise at least one parity bit or the like. Other data correction algorithms may be used.

The node 112 may be at least one physical device and/or participant of the communication system 110 configured for generating, receiving, and/or transmitting information over the at least one communication channel. The node 112 may either be a redistribution point or a communication endpoint. Preferably, all or at least two, three or more of the nodes 112 are set up for communicating with one another in a wireless or wire-based fashion. The communication may be configured in each case in a unidirectional or else bidirectional fashion.

Specifically, each of the nodes 112 may comprise at least one data transmission system for transmitting encrypted data and at least one data receiving system for receiving encrypted data. Each of the nodes 112 may comprise at least one unit or device configured for transmitting data, such as to a radio transmitter, a network transmitter, a modem, an IR-transmitter, a Bluetooth transmitter or the like. Each of the nodes 112 may comprise at least one unit or device configured for receiving data, such as a radio receiver, a network receiver, a modem, an IR receiver, a Bluetooth receiver or the like.

Each of the nodes 112 comprises a printing device 114 configured for generating at least one encryption key for encrypting data based on changing printer control setting 116 and printer job 118. Each node 112 comprises information about possible printer control settings 116 and possible printer jobs 118. The encryption key specifically may be used for data transmission over an insecure channel, such as for encrypting data to be transmitted over the insecure channel and/or for decrypting data after transmission over the insecure channel.

The printing device 114 may be a device configured for applying, e.g. printing, at least one material onto at least one printing surface or substrate, specifically in a patterned fashion, according to the printer control setting 116. Specifically, the printing device 114 may be at least one printer selected from the group consisting of: an inkjet printer, a laser printer.

The printer control setting 116 may be or may comprise printer control information comprising a plurality of parameters for controlling at least one function of the printing device 114. The printer control setting 116 may comprise at least one item of blending information. Thus, typically, the printing device 114 may be configured for generating text and/or images on the at least one printing surface according to the printer control setting 116, such as one or more of a string of characters, a bitmapped image, a vector image, a computer program, e.g. provided in at least one printer control language. In particular, the printing device 114, specifically at least one function of the printing device, may be controllable via at least one printer control language, such as one or more page description languages (PDLs), printer command languages (PCLs), PostScript, XML Paper Specification and the like.

The printer job 118 may be or may comprise at least one digital image of at least one physical object. Each printer job 118 may comprise at least one digital image of at least one physical object.

The possible printer control settings 116 may comprise more than $10^6$ printer control settings 116. The possible printer jobs 118 may comprise about $10^6$ printer jobs 118. An individual number, in particular an integer number, may be assigned to each of the possible printer control settings 116 and possible printer jobs 118. The possible printer control settings 116 and the possible printer jobs 118 may be stored in a database of the printing device 114. The possible printer control settings 116 and the possible printer jobs 118 may be pre-stored by a manufacturer of the printing device 114 and/or may be provided in addition to the printing device 114 by the manufacturer to the customer.

Because the node 112 possess all possible printer control settings 116 and possible printer jobs 118, for generating the encryption key only the key generating information comprising a number referring to the printer control setting 116 and a number referring to the printer job 118 may be required. Said two numbers may be sufficient to control the printing device 114 and for printing the digital image for generating the encryption key.

The generating of the encryption key may comprise selecting a printer control setting 116 and a printer job 118 and performing the printer job 118 with the selected printer control setting 116, wherein the performing of the printer job 118 comprises printing the digital image by mixing pigments;

scanning the mixed pigments and detecting at least one optical signal by using at least one detector of the printing device 114;

transforming the optical signal into the encryption key by using at least one data processing device of the printing device 114 configured for applying at least one transformation algorithm to the optical signal.

With respect to embodiments of the printing device 114 and the generating of the encryption key reference is made to PCT/EP2020/066628, the full content is included herein by reference. The present invention proposes applying the complexity of powder physics where particles of small size, e.g. of sizes from 1 to 10 μm, are behaving reproducible, but unpredictable due the interactions very hard to measure. Hence, this technology applies according to the principle of physical unclonable function, PUF. Specifically, the present invention proposes to enhance the laser printer technology where billions of CMYK pigment particles are mixed. Optical information of the colors of pigment dots may be used and may be transferred into binary information. The entire pigment production of the world (>10 million tons) would be needed to be printed to generate all possible keys.

The encryption key generation according to the present invention may be based on changing the printer control setting 116 in encryption mode, as the first part of the key, and performing printer jobs 118, as the second part of the key, to achieve new unknown optical effects. The new generated optical signals may be scanned inside of the printing device 114 and generated new digital RGB pictures are converted to the binary keys. The physical pictures may be produced only on a transfer belt, which is cleaned afterwards, such that the information about the picture never leaves the printing device 114.

The method, as shown in the embodiment of FIG. 1, comprises the following steps a) (reference number 120) providing an initial session key information via at least one secure channel to each node 112, wherein the initial session key information comprises an initial printer control setting and an initial printer job setting, wherein the initial session key information is different for each node 112;

b) (reference number 122) providing as one-time pad an initial session key package 128 to each of the nodes 112 encrypted with the respective node's initial session key information, wherein the initial session key package 128 comprises a plurality of items of first session key information for communication of the respective receiving node 112 with the other nodes 112 of the communication system 110 wherein two nodes 112 have a common item of first session key information, respectively;

c) (reference number 124) generating at each node 112 second session key information for each of the other nodes 112, wherein the second session key information comprises a second printer control setting and a second printer job setting, wherein the second session key information generated by the respective node 112 for the respective other nodes 112 is different for each of the other nodes 112;

d) (reference number 126) sending a message from one of the nodes 112 to another one of the nodes 112, wherein the message is encrypted with the first session key information for communication between said node 112 and said another one of the nodes 112, wherein the message comprises the second session key information generated by the node 112 sending the message for the node 112 receiving the message such that the node 112 sending the message and the node 112 receiving the message are able for encrypted communication with each other.

The session key information may be or may comprise key generating information for the respective session of key distribution. The key distribution may comprise a plurality of sessions such as an initial session for initiating the communication system 110 to allow secure communication between the nodes 112 and subsequent sessions such as of individual communication between the nodes 112.

Figure 2:
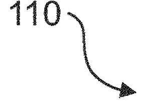
FIG. 2 shows an embodiment of a communication system according to the present invention after step a) of the method according to the present invention.
Figure 2:
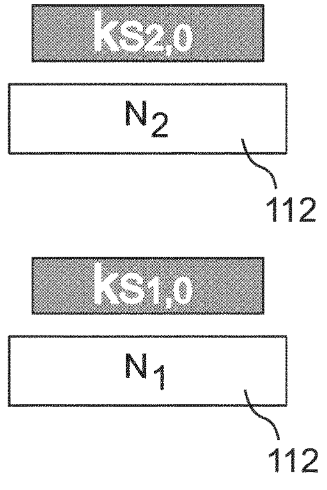
Figure 2:
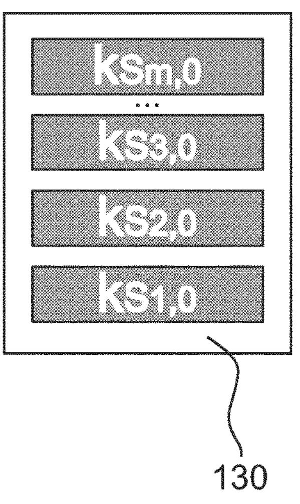
Figure 2:
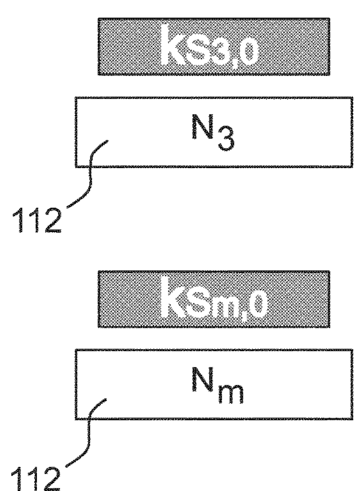

FIG. 2 shows an embodiment of the communication system 110 according to the present invention after step a) 120 of the method according to the present invention. For example, the communication system 110 may comprise m nodes, denoted as nodes i=1 to m with m>1 and abbreviated as $N_i$ in the Figures. The initial session key information ks_i,0 may be or may comprise starting key generating information. The initial session key information ks_i,0 may be pre-defined. Step a) 120 may comprise providing the initial session key information ks_i,0 to the respective node i. The initial session key information is provided to each of the nodes 112. The initial session key information is different for each node 112 such that no two have identical initial session key information. The initial session key information ks_i,0 for each node may comprise a unique combination of one initial printer control setting and one initial printer job setting. The initial session key information ks_i,0 for each node 112 may comprise an individual initial printer control setting and/or initial printer job setting for the respective node 112.

For each node 112 information about the initial printer job (e.g. "1.023.674") and the initial printer setting (e.g. "124.986.234") can be securely distributed and can be used for the printing device 114 of the respective node 112. The initial printer job and the initial printer setting may be given as hexadecimal numbers such as F9EBA and 773237A.

The secure channel may be or may comprise a channel for transmission being accessible only for the transmitting entity and the receiving entity but not to third parties. The secure channel may be or may comprise one or more of the postal service, a telephone connection, a SMS, video conference call (where the number is shown) or there like The secure distribution of the initial session key information ks_i,0 may be done separately, which comprises also the separate distribution of the initial printer control setting and of the initial printer job information. The key generating information for generating encryption keys, in particular standard printer cartridges, printer jobs and printer control settings and algorithms may be distributed publicly. Just the initial session key information ks_i,0 is exchanged secretly via the second channel, which is of very small amount of data.

FIG. 2 shows, in an exemplary fashion, the communication system 110 comprising m nodes, wherein four nodes 112 denoted as node 1, node 2, node 3 and node m, abbreviated as $N_1$, $N_2$, $N_3$ and $N_m$ in FIG. 2 are depicted. At the stage of the method at which the communication system 112 is depicted in FIG. 2, each of the nodes 112 has received its respective initial session key information ks_i,0 via the secure channel. Thus, in FIG. 2, node 1 is in possession of ks_1,0, node 2 is in possession of ks_2,0, node 3 is in possession of ks_3, and node m is in possession of ks_m,0. The initial session key information is different for each node 112. The initial session key information may be provided to each of the nodes 112 by a center hub 130, as indicated in FIG. 2.

Figure 3:
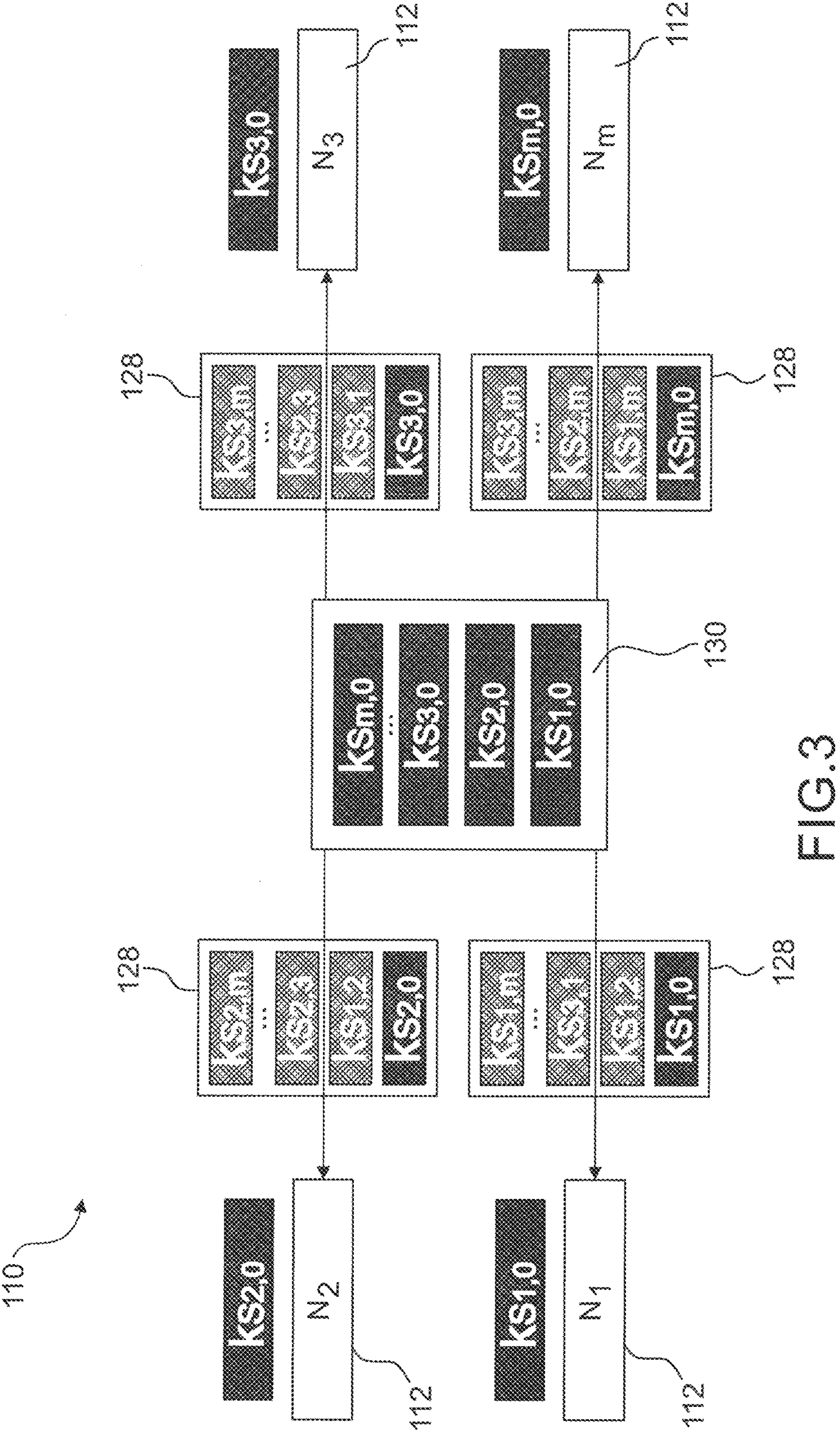
FIG. 3 shows the communication system of FIG. 2 performing step b) of the method according to the present invention.

FIG. 3 shows the communication system 110 of FIG. 2 performing step b) 122 of the method according to the present invention.

The initial session key package 128 for a node 112 may comprise a set of items of first session key information comprising a list of unique combination of one initial printer control setting and one initial printer job setting for communication of the respective node 112 with the other nodes 112 of the communication system 110. An item of first session key information may refer to generating key information required for secure communication between the respective node 112 and one of the other nodes 112. Two nodes 112 have one item of first session key information in common, respectively. The other items of first session key information of the respectively received initial session key package differ between the nodes 112. Specifically, the initial session key package 128 may be provided to each node by the at least one center hub 130.

The initial session key package 128 is provided as one-time pad (OTP). A unique initial session key package 128 may be provided encrypted with the respective node's initial session key information ks_i,0 to the respective node 112. For example, for the exemplary communication system 110 comprising nodes i=1 to m with m>1, a unique initial session key package 128 may be provided to each of the nodes 112 by the center hub 130 encrypted with the respective node's initial session key information ks_i,0 to the respective node 112. Specifically, for the respective node i, the initial session key package 128 is encrypted with the node's key KS_i,0 generated from ks_i,0. Step b) 122 may comprise decrypting the initial session key package 128 using the respective node's key KS_i,0. The initial session key package 128 may comprise for the respective node i a set of the first session key information ks_i,i+j with j=1 to (m−i). The initial session key package 128 may comprise for the respective node i+1 a set of the first session key information ks_i,i+1, ks_i+1,(i+1)+j with j=1 to (m−i). Thus, after step b) 122, pairs of nodes 112 share the respective first session key information for communication with each other.

FIG. 3 shows the exemplary communication system 112 comprising m, wherein four nodes $N_1$, $N_2$, $N_3$ and $N_m$ are depicted. At the stage at which the communication system 112 is depicted in FIG. 3, step b) 122 is performed. Thus, in FIG. 3, the center hub 130 provides each of the nodes 112 with the initial session key package 128, as indicated by the arrows pointing from the center hub 130 to each of the nodes 112. The initial session key package 128 comprises the plurality of items of first session key information. The initial session key package 128 may be encrypted with the respective node's initial session key information ks_i,0. Specifically, the unique initial session key package 128 for node 1 may be encrypted with initial session key information ks_1, 0, the unique initial session key package 128 for node 2 may be encrypted with initial session key information ks_2,0, the unique initial session key package 128 for node 3 may be encrypted with initial session key information ks_3,0 and the unique initial session key package 128 for node m may be encrypted with initial session key information ks_m,0. This is illustrated in FIG. 3 by indicating at the bottom of each list of items of first session key information the respective initial session key information ks_i,0 that may be used for encrypting said items. It shall be noted, however, that the initial session key information is not part of the initial session key package 128 but is merely used for its encryption. This difference between the items of first session key information, which form part of the initial session key package 128, and the initial session key information, which may be used for encrypting the initial session key package 128, is indicated in FIG. 3 by different shadings of the items of first session key information and initial session key information.

The initial session key package 128 comprises the plurality of items of first session key information for communication of the respective receiving node 112 with the other nodes 112 of the communication system 110, wherein any two nodes 112 have a common item of first session key information. Thus, in the exemplary communication system 110 shown in FIG. 3, node 1 and node 2 have the common item of first session key information ks_1,2, node 1 and node 3 have the common item of first session key information ks_3,1 and node 1 and node m have the common item of first session key information ks_1,m. Further, node 2 and node 3 have the common item of first session key information ks_2,3 and node 2 and node m have the common item of first session key information ks_2,m. Furthermore, node 3 and node m have the common item of first session key information ks_3,m.

In step c) 124 at each node second session key information for each of the other nodes 112 is generated. An algorithmic random number generator may be used for generating of the second session key information, in particular for generating numbers for a second printer control setting and a second printer job. The second session key information, in particular the combination of second printer control setting and second printer job, may be different from the initial session key information. In particular, node i may generate for communication with node i+1 second key information ks_i+1,i. For example, node i may generate for communication with node m second key information ks_m, i. Each of the nodes 112 may comprise an algorithmic random number generator. The algorithmic random number generators of the nodes 112 may work asynchronous.

Figure 4:
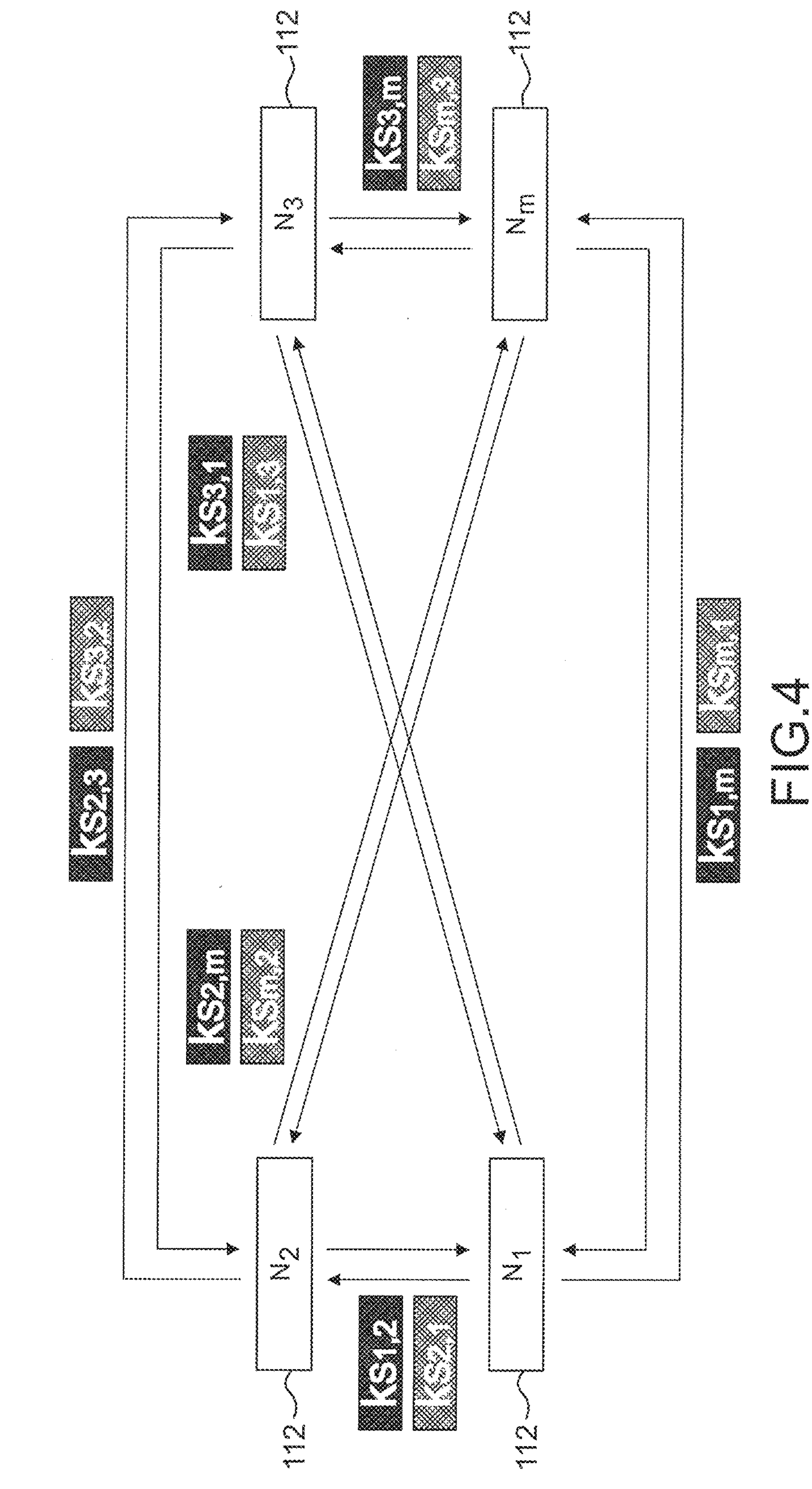
FIG. 4 shows the communication system of FIG. 2 performing step d) of the method according to the present invention.

FIG. 4 shows the communication system 110 of FIG. 2 performing step d) 126 of the method according to the present invention. Step d) 126 comprises sending a message from one of the nodes 112 to another one of the nodes 112, wherein the message is encrypted with the first session key information for communication between said node 112 and said another one of the nodes 112, wherein the message comprises the second session key information generated by the node 112 sending the message for the node 112 receiving the message such that the node 112 sending the message and the node 112 receiving the message are able for encrypted communication with each other. Step d) 126 may be repeated by all nodes of the communication system 110 using the respective first session key information and second session key information. As the pairs of nodes 112 share the respective first session key information for communication with each other encrypted communication between all nodes of the communication system 110 is possible. After step d) 126 the communication system 110 may be autarkic without any further key distribution, since the second session key information is provided together with the message.

FIG. 4 illustrates possible communication in the communication system 110 that may take place according to the present invention, particularly as part of step d) 126. FIG. 4 shows that each of the four depicted nodes 112 may communicate with each of the other nodes 112 in an encrypted fashion, as indicated by the arrows. Specifically, each node 112 may send a message to any one of the nodes 112, wherein the message may first be encrypted using the item of first session key information, which the sending node 112 and the receiving node 112 have in common. Thus, as examples for this communication, FIG. 4 indicates the communication between node 1 and node 2 based on their common item of first session key information ks_1,2. FIG. 4 further indicates the communication between node 1 and node 3 based on their common item of first session key information ks_3,1. FIG. 4 further indicates the communication between node 1 and node m based on their common item of first session key information ks_1,m. Furthermore, FIG. 4 further indicates the communication between node 2 and node 3 based on their common item of first session key information ks_2,3. FIG. 4 further indicates the communication between node 2 and node m based on their common item of first session key information ks_2,m. Furthermore, FIG. 4 further indicates the communication between node 3 and node m based on their common item of first session key information ks_3,m.

The encrypted communication just described may be used to exchange the second session key information generated by the node 112 sending the message for the node 112 receiving the message such that the node 112 sending the message and the node 112 receiving the message are able for encrypted communication with each other. Thus, further encrypted communication based on the second session key information may then take place between the nodes 112 of the communication system 110. In the shown example, in particular, node 1 may generate for communication with node 2 second key information ks_2,1. For example, node 1 may generate for communication with node m second key information ks_m,1.

FIG. 4 illustrates encrypted communication between each pair of nodes 112 may take place on two different bases, specifically their respective common item of first session key information and the second session key information. In FIG. 4, the first session key information is used for encryption, and thus, is active, whereas the second session key information is send as part of the encrypted data, and thus, can be used in the subsequent communication for encryption. Thus, as already described in detail above, encrypted communication between two nodes may first take place on the basis of the respective common item of first session key information and subsequently on the basis of the second session key information. The fact that in FIG. 4, the first session key information is active and that the second session key information can be used later on is indicated in FIG. 4 by the different shadings.

Figure 5A:
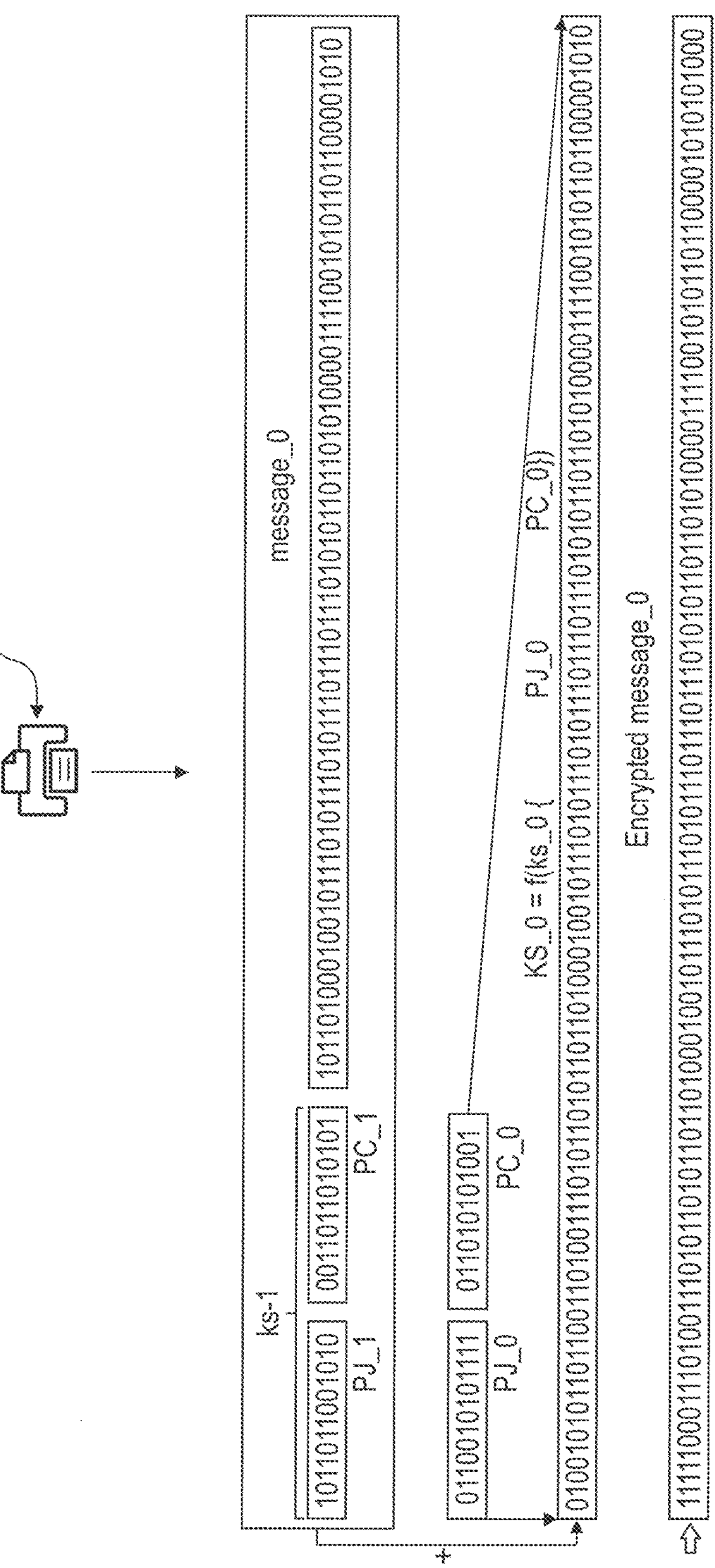
FIGS. 5A and 5B show an embodiment of step d) (FIG. 5A) and encryption key generation (FIG. 5B).

FIG. 5A shows an embodiment of step d) 126, wherein an encrypted message_0 is send from node i to another node 112, e.g. node i+1. The encrypted message_0 may be generated as follows. The first session key information ks_0 owned by node i and node i+1 for communication between node i and node i+1 may comprise a printer job, denoted printer job_0 in this case 0110010101111, and a printer control setting, denoted as printer control_0 in the present case 011010101001. In the Figures, specifically in FIGS. 5A and 5B, the printer job and the printer job setting may be denoted in an abbreviated fashion as PJ and the printer control and the printer control setting may be denoted in an abbreviated fashion as PC. Thus, as an example, in FIG. 5A the printer job_0 is denoted as PJ_0 and the printer control_0 is denoted as PC_0. The encryption key generated based on printer job_0 and printer control_0 may be denoted KS_0 and may be generated as KS_0=f(ks_0 {printer job_0, printer control_0}) using the printing device 114, wherein f is the physical unclonable function, in particular applied according to PCT/EP2020/066628. In this embodiment KS_0 may be 01001010110110011010011101011010110110100010010111010111010111011101110101011011010100001111001010110110000101

In step d) 126, node i may send a message, denoted message_0, to node i+1. In addition, node I may send the second session key information generated by node i for communication with node i+1 to node i+1. The second session key information generated by node i for communication with node i+1 may comprise a printer job printer job_1 and a printer control setting printer control_1. These two elements, the message_0 and second session key information (printer job_1 and printer control_1) may be encrypted by node i using the encryption key KS_0. The encrypted message may be in this embodiment 11111000111010011101011010110110100010010111010111010111011101110101011011010100000111100101011011000010101010 00.

Figure 5B:
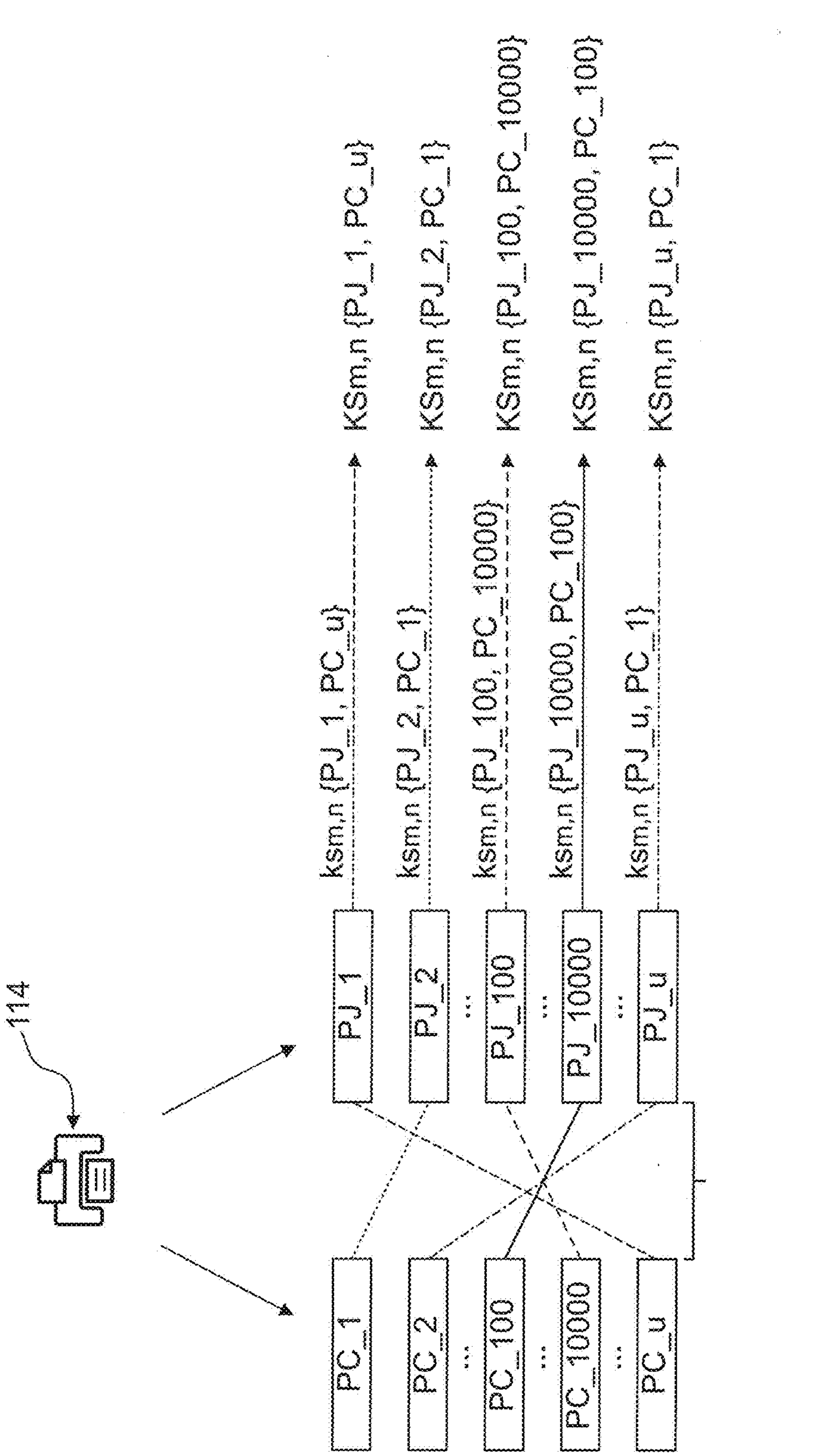

FIG. 5B shows generating encryption keys according to the present invention using the printing device 114. FIG. 5B shows two lists, a first list comprising possible printer control settings 116, denoted with printer control_1 to printer control_u, and a second list, comprising possible printer jobs 118, denoted with printer job_1 to printer job_u. The printer control settings 116 and the printer jobs 118 may be predefined and may provided by a manufacturer together with the printing device 114. The encryption key may be generated based on session key information, also denoted as key generating information, wherein the key generating information comprises a printer control settings 116 and a printer job 118. Because the node 112 possess all possible printer control settings 116 and possible printer jobs 118, for generating the encryption key only the key generating information comprising a number referring to the printer control setting 116 and a number referring to the printer job 118 may be required. Said two numbers may be sufficient to control the printing device 114 and for printing the digital image for generating the encryption key. In FIG. 5B, exemplary combinations of printer control settings 116 and printer job 118 are depicted. For example, session key information ks_m,n may comprise printer job_1, abbreviated as PJ_1, and control setting_u, abbreviated as PC_u, such that ks_m,n {PJ_1, PC_u}. The encryption key KS_m,n generated based on ks_m,n {PJ_1, PC_u} may be KS_m,n {PJ_1, PC_u}.

LIST OF REFERENCE NUMBERS

110 communication system
112 node
114 printing device
116 printer control setting
118 printer job
120 step a)
122 step b)
124 step c)
126 step d)
128 initial session key package
130 center hub

The invention claimed is:

1. A computer-implemented method for distributing symmetric encryption keys in a communication system comprising a plurality of nodes, wherein each of the nodes comprises a printing device configured for generating at least one encryption key for encrypting data based on changing printer control setting and printer job, wherein each node comprises information about possible printer control settings and possible printer jobs, the method comprising the following steps:

a) providing an initial session key information via at least one secure channel to each node, wherein the initial session key information comprises an initial printer control setting and an initial printer job setting, wherein the initial session key information is different for each node;

b) providing as a one-time pad an initial session key package to each of the nodes encrypted with the respective node's initial session key information, wherein the initial session key package comprises a plurality of items of first session key information for communication of the respective receiving node with the other nodes of the communication system, wherein any two nodes have a common item of first session key information;

c) generating at each node second session key information for each of the other nodes, wherein the second session key information comprises a second printer control setting and a second printer job setting, wherein the second session key information generated by the respective node for the respective other nodes is different for each of the other nodes;

d) sending a message from one of the nodes to another one of the nodes, wherein the message is encrypted with the first session key information for communication between said node and said another one of the nodes, wherein the message comprises the second session key information generated by the node sending the message for the node receiving the message such that the node sending the message and the node receiving the message are able for encrypted communication with each other.

2. The method according to claim 1, wherein each printer job comprises at least one digital image of at least one physical object.

3. The method according to claim 2, wherein the generating of the encryption key comprises selecting a printer control setting and a printer job and performing the printer job with the selected printer control setting, wherein the performing of the printer job comprises printing the digital image by mixing pigments;

scanning the mixed pigments and detecting at least one optical signal by using at least one detector of the printing device;

transforming the optical signal into the encryption key by using at least one data processing device of the printing device configured for applying at least one transformation algorithm to the optical signal.

4. The method according to claim 1, wherein an algorithmic random number generator is used for generating of the second session key information.

5. The method according to claim 1, wherein an individual number is assigned to each of the possible printer control settings and possible printer jobs.

6. The method according to claim 1, wherein the possible printer control settings and the possible printer jobs are stored in a database of the printing device.

7. The method according to claim 1, wherein the possible printer control settings comprise more than $10^6$ printer control settings and the possible printer jobs comprise about $10^6$ printer jobs.

8. The method according to claim 1, wherein step b) comprises decrypting the initial key package using the respective node's initial session key information provided in step a).

9. The method according to claim 1, wherein in steps a) to d) of the method solely symmetric encryption is used.

10. A non-transitory computer readable medium comprising instructions which, when a program is executed by a computer of computer network cause the computer of computer network to perform the method for distributing symmetric encryption keys in a communication system comprising a plurality of nodes, wherein each of the nodes comprises a printing device configured for generating at least one encryption key for encrypting data based on changing printer control setting and printer job, wherein each node comprises information about possible printer control settings and possible printer jobs, the method comprising the following steps:

a) providing an initial session key information via at least one secure channel to each node, wherein the initial session key information comprises an initial printer control setting and an initial printer job setting, wherein the initial session key information is different for each node;

b) providing as a one-time pad an initial session key package to each of the nodes encrypted with the respective node's initial session key information, wherein the initial session key package comprises a plurality of items of first session key information for communication of the respective receiving node with the other nodes of the communication system, wherein any two nodes have a common item of first session key information;

c) generating at each node second session key information for each of the other nodes, wherein the second session key information comprises a second printer control setting and a second printer job setting, wherein the second session key information generated by the respective node for the respective other nodes is different for each of the other nodes;

d) sending a message from one of the nodes to another one of the nodes, wherein the message is encrypted with the first session key information for communication between said node and said another one of the nodes, wherein the message comprises the second session key information generated by the node sending the message for the node receiving the message such that the node sending the message and the node receiving the message are able for encrypted communication with each other.

11. A communication system comprising: a plurality of nodes, wherein each of the nodes comprises a printing device configured for generating at least one encryption key for encrypting data based on changing printer control setting and printer job, wherein each node comprises information about possible printer control settings and possible printer jobs, wherein the communication system is configured for providing an initial session key information via at least one secure channel to each node, wherein the initial session key information comprises an initial printer control setting and an initial printer job setting, wherein the initial session key information is different for each node, wherein the communication system further comprises at least one center hub configured for providing as a one-time pad an initial session key package to each of the nodes encrypted with the respective node's initial session key information, wherein the initial session key package comprises a plurality of items of first session key information for communication of the respective receiving node with the other nodes of the communication system, wherein any two nodes have a common item of first session key information, wherein each of the nodes is configured for generating at each node second session key information for each of the other nodes, wherein the second session key information comprises a second printer control setting and a second printer job setting, wherein the second session key information generated by the respective node for the respective other nodes is different for each of the other nodes, wherein each of the nodes is configured for sending a message from one of the nodes to another one of the nodes, wherein the message is encrypted with the first session key information for communication between said node and said another one of the nodes, wherein the message comprises the second session key information generated by the node sending the message for the node receiving the message such that the node sending the message and the node receiving the message are able for encrypted communication with each other.

12. The communication system according to claim 11, wherein the communication system is configured for distributing symmetric encryption keys.

13. An apparatus for distributing symmetric encryption keys in a communication system comprising a plurality of nodes, wherein each of the nodes comprises a printing device configured for generating at least one encryption key for encrypting data based on changing printer control setting and printer job, wherein each node comprises information about possible printer control settings and possible printer jobs, the apparatus comprising a memory storing instructions; and a processor configured to:

a) providing an initial session key information via at least one secure channel to each node, wherein the initial session key information comprises an initial printer control setting and an initial printer job setting, wherein the initial session key information is different for each node;

b) providing as a one-time pad an initial session key package to each of the nodes encrypted with the respective node's initial session key information, wherein the initial session key package comprises a plurality of items of first session key information for communication of the respective receiving node with the other nodes of the communication system, wherein any two nodes have a common item of first session key information;

c) generating at each node second session key information for each of the other nodes, wherein the second session key information comprises a second printer control setting and a second printer job setting, wherein the second session key information generated by the respective node for the respective other nodes is different for each of the other nodes;

d) sending a message from one of the nodes to another one of the nodes, wherein the message is encrypted with the first session key information for communication between said node and said another one of the nodes, wherein the message comprises the second session key information generated by the node sending the message for the node receiving the message such that the node sending the message and the node receiving the message are able for encrypted communication with each other.

* * * * *